(12) United States Patent
Wiemann et al.

(10) Patent No.: US 8,553,698 B2
(45) Date of Patent: *Oct. 8, 2013

(54) DATA UNIT SENDER AND DATA UNIT RELAY DEVICE

(75) Inventors: Henning Wiemann, Aachen (DE);
Reiner Ludwig, Hürtgenwald (DE);
Michael Meyer, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 389 days.

This patent is subject to a terminal disclaimer.

(21) Appl. No.: 12/911,025

(22) Filed: Oct. 25, 2010

(65) Prior Publication Data

US 2011/0038376 A1 Feb. 17, 2011

Related U.S. Application Data

(63) Continuation of application No. 11/574,494, filed as application No. PCT/EP2004/009967 on Sep. 7, 2004, now Pat. No. 7,839,858.

(60) Provisional application No. 60/605,924, filed on Aug. 31, 2004.

(51) Int. Cl.
*H04L 12/28* (2006.01)
(52) U.S. Cl.
USPC ............ 370/394; 370/465; 714/748; 714/750
(58) Field of Classification Search
USPC ................................................. 714/748, 750
See application file for complete search history.

(56) References Cited

U.S. PATENT DOCUMENTS

| 4,344,171 A | 8/1982 | Lin et al. |
| 4,726,027 A | 2/1988 | Nakamura et al. |
| 5,699,367 A | 12/1997 | Haartsen |

(Continued)

FOREIGN PATENT DOCUMENTS

| EP | 0054118 | 10/1981 |
| EP | 0193091 | 2/1986 |

(Continued)

OTHER PUBLICATIONS

Hari Balakrishnan et al., "A Comparison of Mechanisms for improving TCP Performance over Wireless Links", Aug. 1996, Stanford, CA.

(Continued)

*Primary Examiner* — Duc C Ho

(57) ABSTRACT

New methods and devices for implementing an ARQ mechanism over a multi-hop connection (sender-relay-receiver) are proposed. A communication protocol is described in accordance with which data units are arranged in a sequence and each sent data unit is identifiable by a sequence position identifier. The sender implements a sending peer, the relay a relay peer and the receiver a receiving peer. Feedback messages are exchanged, which using said sequence position identifiers, carry information on a receipt of sent data units. The communication protocol provides for at least a first type and a second type of receipt information, the first type (RACK) of receipt information being indicative of a correct receipt of a data unit at a relay peer of said communication protocol, and the second type (ACK) of receipt information being indicative of a correct receipt of a data unit at a final destination peer of said communication protocol.

58 Claims, 15 Drawing Sheets

(56) References Cited

U.S. PATENT DOCUMENTS

| | | | |
|---|---|---|---|
| 5,799,012 A | | 8/1998 | Ayerst et al. |
| 6,744,766 B2 | | 6/2004 | Alapuranen |
| 7,839,858 B2* | 11/2010 | Wiemann et al. | 370/394 |
| 7,864,799 B2* | 1/2011 | Sachs | 370/466 |
| 2001/0032325 A1 | 10/2001 | Fong et al. | |
| 2005/0068894 A1* | 3/2005 | Yu et al. | 370/235 |

FOREIGN PATENT DOCUMENTS

| | | |
|---|---|---|
| EP | 1 179 909 A2 | 2/2002 |
| GB | 2 327 019 A | 1/1999 |
| TW | 313734 | 8/1997 |
| WO | WO 03/069837 A | 8/2003 |

OTHER PUBLICATIONS

Masaharu Komatsu: "Simple Go-Back-N ARQ Scheme for Satellite Channels With Double Acknowledgements" Electronics & Communications in Japan, Part I—Communications, Scripta Technica. New York, US, vol. 74, No. 5, (May 1, 1991), pp. 55-62, XP000274094 ISSN: 8756-6621 p. 55-p. 57.

Mase, et al: "Go-Back-N ARQ Schemes for Point-to-Multipoint Satellite Communications". IEEE Transactions on Communications, vol. 31, Com 4. 1983.

* cited by examiner

DATA UNIT SENDER AND DATA UNIT RELAY DEVICE

CLAIMING BENEFIT OF PRIOR FILED U.S. APPLICATION

This application is a continuation application of U.S. patent application Ser. No. 11/574,494, filed Feb. 28, 2007, now U.S. Pat. No. 7,839,858, which was a 371 of PCT/EP2004/009967 filed on Sep. 7, 2004, which claimed the benefit of U.S. Provisional Application Ser. No. 60/605,924 filed on Aug. 31, 2004. The contents of these documents are hereby incorporated by reference herein.

FIELD OF THE APPLICATION

The present application relates to a data unit sender and to a data unit relay device, which are arranged to provide a communication of data units from said data unit sender via said data unit relay device to a data unit receiver. The application also relates to corresponding control methods for the data unit sender and data unit relay device.

BACKGROUND OF THE INVENTION

The present invention basically relates to the general field of data unit communication. In data unit communication, an amount of data is divided into individual units, and said units are transmitted to a desired receiver over an appropriate communication path. This form of data communication is very well known and in wide use.

Such data units carry a variety of names in the context of different communication systems and communication protocols, such as packets, frames, segments, protocol data units, etc. The term "data unit" as used in the present specification and claims generically refers to any such division of a data amount.

In order to ensure the complete transmission of data units from a sender to a receiver, a mechanism referred to as ARQ (Automatic Retransmission reQuest) is known. When using an ARQ mechanism, the receiver of data units sends feedback messages to the sender, such that the sender can determine whether sent data units were properly received, and if not, to appropriately perform retransmissions of data units.

It can also occur that the communication of data units from a given sender to a given receiver occurs via one or more relay points. One example of such a situation is if a desk top computer communicates with a portable computer that has a WLAN module, where the communication is handled via a WLAN router. Another example of such a situation is if a link layer (layer 2) communication between a sender and receiver occurs over several relay points. Such connections are also referred to as multi-hop connections.

The basic problem encountered with such multi-hop connections is how to provide a reliable transmission of data units from the sender (i.e. the sending end-point) to the receiver (i.e. the receiving end-point). The paper "A comparison of Mechanisms for Improving TCP Performance over Wireless Links" by H. Balakrishnan et al, Proc. ACM SIGCOMM'96, Stanford, Calif., August 1996, gives an overview of techniques for dealing with multi-hop connections that involve wireless links.

One known solution to the multi-hop problem is the provision of split connections. An example of this principle is shown in FIG. 1. In the example of FIG. 1, a link layer (layer 2) communication between a sender 10 and receiver 12 via a relay device 11 is considered. In order to provide reliable transmission of layer 2 data units, a sending peer 10_2 in sender 10 and a receiving peer 11_2b in the relay device 11 implement an ARQ mechanism, and furthermore a sending peer 11_2a of relay device 11 and a receiving peer 12_2 of receiver 12 implement another ARQ mechanism. In this way, the first ARQ mechanism provides for reliability from sender 10 to relay device 11, and the second ARQ mechanism provides for reliability in the communication from relay device 11 to receiver 12. Naturally, this split connection concept is applicable to any layer, not just the link layer. Nonetheless, it suffers from the disadvantage that if any problems occur in the relay device 11, or a handover from the shown relay device 11 to another relay device becomes necessary, then the entire end-to-end communication is in jeopardy. More specifically, it can occur that the sender 10 has completed its communication with the relay device 11, as the correct receipt of data units at relay 11 has been acknowledged to sender 10, and thereafter a problem occurs in relay device 11, such that some of these data units are lost. In such an event, these data units will be irrevocably lost at the given protocol level (L2 in the example), as the sender has already completed its communication and consequently deleted the data units from its send buffer.

In order to avoid such problems, it is known to introduce sub-layering. This is shown in an example in FIG. 2. The example again relates to a link layer communication between a sender and a receiver 22. In order to provide end-to-end reliability, the link layer L2 is divided into two sub-layers, where the upper sub-layer has two peers 20_2' and 22_2' located at the sender 20 and receiver 22, respectively. These two peers implement their own ARQ mechanism, in order to provide for retransmission if data units of this upper sub-layer are lost on the end-to-end connection. Additionally, a lower sub-layer is provided, having respective peers 20_2 and 21_2b between sender 20 and relay device 21, and 21_2a and 22 2 between relay device 21 and receiver 22. The data units of the upper sub-layer are encapsulated or segmented into data units of the lower sub-layer, and each lower sub-layer peer pair has its own ARQ mechanism. Modifications of this sub-layering concept are known, e.g. U.S. Pat. No. 5,699,367 describes a situation, where the lower sub-layer is only provided on one hop, e.g. only between sender 20 and relay device 21.

Due to the end-to-end ARQ mechanism of peers 20_2' and 22_2', problems in the relay device 21 do not lead to irrevocable data unit loss. On the other hand, the ARQ mechanisms on the hops from sender to relay device and relay device to receiver ensure resource efficient and fast error recovery over each hop, e.g. by avoiding unnecessary end-to-end retransmissions. Nonetheless, the concept of sub-layering has the disadvantage of requiring complicated adjustment of the ARQ control in the upper sub-layer and lower sub-layer, in order to avoid ARQ conflicts, which can e.g. lead to unnecessary redundant data transmission, which in turn degrades the end-to-end performance.

WO 03/069837 A1 describes a method for retransmission of packets in a base station sub-subsystem. A BSC communicates with an MS via a BTS, where the BSC and BTS are connected over a transport network. The BSC and the BTS use the GSL protocol on the physical layer. On the other hand, the BSC and the MS are RLC peers. It is disclosed to provide two types of messages between the BSC and the BTS: a first message format that comprises a data block, and a second format that only uses heeders but does not comprise a data block. In this way, the message of the second format identifies a data block, but does not carry the data block. Moreover, the BTS stores the data blocks that it successfully receives. The BTS also forwards these data blocks to the MS. If the MS does not receive a data block correctly, this is identified with the help of a NACK message sent in response to a polling signal. Two basic alternatives are described, where the first alternative is such that the BTS sends reception status messages in response to a polling signal, in order to inform the BSC. In this first alternative, the BTS passes the ACKs/NACKs sent by the MS to the BSC without any processing. The BSC does not need to send a message of the first format (with data block), as it is sufficient to send a message of the second format (without data block), such that the BTS can identify the missing data block and perform the retransmission, without having to again send the data block over the transport network.

On the other hand, if a reception status message sent by the BTS to the BSC indicates a missing data block, then the BSC retransmits a message of the first format (i.e. with the missing data block). The BSC is controlled in such a way that if a NACK from the MS arrives, the BSC knows that this is cue to an error in the transport network and as been corrected by an appropriate retransmission. After having received ACK messages from the MS, the BSC sends clear messages to the BTS, such that the BTS removes corresponding data blocks from its memory. In the second alternative, the BTS does not confirm a successful reception of data blocks, but only requests retransmissions of data blocks that have not been correctly received. In this second alternative the BTS must itself take care of the maintenance of its memory and it will not be the BSC that controls the removal of stored data blocks in the memory of the BTS. Namely the BTS waits for acknowledgment messages 332 from the MS and interprets these messages. If a NACK is received from the MS, the BTS first checks whether it has the corresponding data block in its memory, and retransmits the data block if it is available. If it is not available, then the BTS requests the retransmission of the missing data block from the BSC. The BTS also forwards the NACK. In this way the BSC can respond in one of two ways if it receives the NACK and a retransmission request, it sends a message of the first format (with data block), otherwise it sends a message of the second format (without the data block).

OBJECT OF THE INVENTION

The object of the invention is to provide an improved concept for reliable data unit transmission from a sender to a receiver via a relay device.

SUMMARY OF THE INVENTION

This object is solved by a data unit sender, data unit relay device, method of controlling a data unit sender, method of controlling a data unit relay device and communication protocol as described in the independent claims. Advantageous embodiments are described in the dependent claims.

The basic concept of the present invention is shown in FIG. 3. In accordance with the present invention a data unit communication between a sender 30 and a receiver 32 via a relay device 31 is handled in one layer, where the sender 30 comprises a sending peer 30_2 and the receiver 32 a receiving peer 32_2, and the relay device 31 carries a relay peer 31_2. The communication occurs in accordance with a communication protocol for the sending peer, relay peer and receiving peer, where this communication protocol has a feed-back mechanism, and the feed-back messages are such that they carry information on the receipt of data units. The communication protocol provides for at least a first type and a second type of receipt information, where the first type of receipt information is indicative of a correct receipt of a data unit at the relay peer (31_2 in the example of FIG. 3) and the second type of receipt information is indicative of a correct receipt of a data unit at the final destination peer (32_2 in the example of FIG. 3) of the protocol. The sending peer (30_2 in the example of FIG. 3) performs a first retransmission control procedure for a sent data unit for which no first type receipt information has been received, and a second receipt retransmission control procedure for a sent data unit if the first type receipt information has been received. Namely, looking at the example of FIG. 3, not having received first type receipt information means that the relay peer 31_2 has not acknowledged correct receipt. On the other hand, receiving the first receipt information means that the relay peer 31_2 has acknowledged correct receipt. Nonetheless, the sender holds a data unit in its buffer at least until having received the second type of receipt information, namely information that indicates that the data unit in question has been received at the final destination (receiving peer 32_2 in the example of FIG. 3).

The relay peer of the invention is arranged to on the one hand send sender-side feedback messages to the sending peer (30 in the example of FIG. 3), which feedback messages provide the first type of receipt information when a data unit was correctly received from the sending peer 30_2. On the other hand, the relay peer generates send data units based on the receive data units, and transmits these send data units to the receiving peer. In accordance with the invention, the receive data units (i.e. the data units received from the sending peer) and the send data units (i.e. the data units transmitted to the receiving peer) use the same sequence position identifiers. When the relay peer receives a feed back message on the receiver-side (from the receiving peer 32_2 in the example of FIG. 3), then it generates a sender-side feedback message directed towards the sender-side peer (the sending peer 30_2 in the example of FIG. 3) carrying the second type of receipt information for the given sequence position identifier that was already associated with the second type of receipt information in the receiver-side feedback message. Expressed in other words, when the relay peer receives an acknowledgement that a data unit has been correctly received at the final destination peer, then such an acknowledgement is passed on towards the sender.

Based on the use of two different kinds of receipt information, one for indicating correct receipt at a relay device and another for indicating correct receipt at the final destination, the sender and the relay device (or several relay devices, if more than one relay device is involved) can appropriately manage their own retransmission function and buffer management, while both end-to-end-reliability and reliability on individual hops is ensured. This is achieved without the necessity of sub-layering, and consequently without the complexities or problems that occur due to ARQ conflicts between different sub-layers.

The present invention provides a highly reliable mechanism for multi-hop data unit communication that is very simple at the same time.

BRIEF DESCRIPTION OF FIGURES

The present invention will be explained in more detail in the following by making reference to specific embodiments that are described with respect to the figures, where.

DETAILED DESCRIPTION OF EMBODIMENTS

Figure 10:
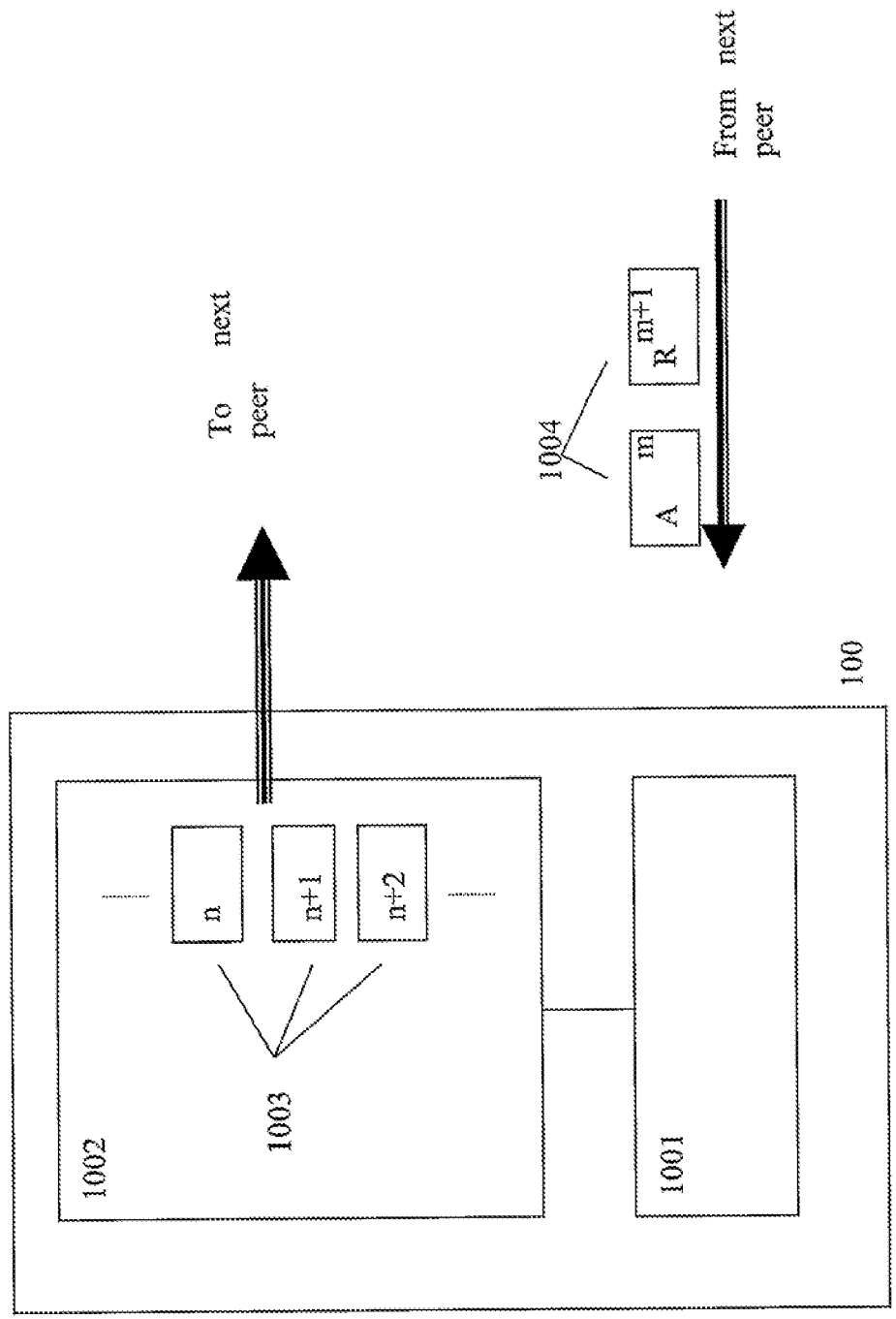
FIG. 10 shows a schematic diagram of an embodiment of a data unit sender.

FIG. 10 shows a schematic arrangement of a data unit sender 100 arranged in accordance with an embodiment of the present invention. The data unit sender 100 comprises a data unit buffer 1002 for holding data units 1003 of a communication protocol. A control unit 1001 is arranged to control a transmission of the data units 1003 to a peer of the communication protocol, a processing of feedback messages 1004 received from that peer, a re-transmission of the data units 1003 based on the feedback messages 1004, and a management of the buffer The control unit 1001 is arranged to let the data unit sender 100 act as a sending peer of the mentioned communication protocol. The term "buffer management" means the controlled placing of data units into the buffer and the controlled removal of data units from the buffer.

The buffer can be any type of memory suitable for holding data units, and the control unit can equally be any device suitable for performing the control functions, e.g. the control unit can be a programmable processor.

The communication protocol is such that the data units 1003 are arranged in a sequence, and each sent data unit is identifiable by a sequence position identifier. The feedback messages 1004 use the sequence position identifiers and carry information on the receipt of the data units 1003. In accordance with the invention, the communication protocol provides for at least a first type and a second type of receipt information. The first type of receipt information is indicative of a correct receipt of a data unit 1003 at a relay peer of the communication protocol, and the second type of receipt information is indicative of a correct receipt at a final destination peer of the communication protocol.

The control unit 1001 is arranged to perform a first re-transmission control procedure for a given data unit that has been sent but for which no first type receipt information has been received, and to perform a second re-transmission control procedure for the given data unit if the first type receipt information has been received. Furthermore, the control unit 1001 is arranged to hold the given data unit in the buffer 1002 at least until having received the second type of receipt information for the given data unit.

In accordance with the present invention, the data unit sender is capable of distinguishing whether a sent data unit of the given communication protocol was correctly received at a relay peer of the given communication protocol, or whether it was received at the final destination peer of the protocol. The sending peer can accordingly adjust its re-transmission procedure. Namely, if no first type receipt information is received for a given data unit, this means that the sender has no acknowledgement that it was received at a relay peer. In this case the first re-transmission procedure is used, which is arranged to ensure reliable delivery to the next peer, typically a relay peer. On the other hand, if the first receipt information has been received for a given data unit, this means that delivery to a relay peer was successful, and the second re-transmission control procedure can be used, which is different from the first in that the sender can at least temporarily delegate the responsibility for the further delivery of the data unit to the relay device that sent the first type receipt information. Nonetheless, the second re-transmission control procedure has a retransmission function, in order to be able to safeguard reliable transmission to the final destination peer in the event that problems occur at the one or more relay peers involved in the communication. As an example, the first re-transmission control procedure can be based on a time-out function having a first time-out value, such that if no first type receipt information is received within the time span of said first time-out value, a re-transmission transmission is performed. The second re-transmission control procedure can be based on a second time-out value, such that if no second type receipt information is received within the second time-out period, then a re-transmission is performed. The second time-out period is longer than the first time-out period. Another example is if the protocol additionally provides for third type receipt information, which indicates an incorrect receipt (an incorrect receipt means not received at all or received with an incorrectable error), then the second re-transmission control procedure may be chosen such that there is no time-out function, but that a data unit is re-transmitted in the event that the above-mentioned third type of receipt information is received, even if previously the first type receipt information was received for the same data unit. Different possibilities for the first and second re-transmission control procedures will be explained in more detail with reference to FIGS. 12 and 13 later.

It is noted that the sequence position identifiers, which are shown as n, n+1, n+2, ..., m, m+1, ... in FIG. 10b, can be chosen in any suitable or desirable way. Namely, they can be chosen as shown in the example of FIG. 10, i.e. as integer values that directly correspond to the sequence position (1, 2, 3, ... ). However, they can e.g. also be chosen as bit or byte count values, which indicate a certain bit or byte position in a data symbol stream that is being transported in the data units. Such a concept is e.g. known from TCP/IP.

In the example of FIG. 10, each data unit 1003 carries a sequence position identifier, and the shown feedback message 1004 also each carry a sequence position identifier. In the shown example, the first feedback message 1004 carries an "A", which stands for ACK, which in turn will be used in the present specification as an example for the second type receipt information. The second feedback message 1004 contains an R, which stands for RACK, which will be used in the present specification as an example of the first type receipt information. RACK stands for relay acknowledgement.

Naturally, this is only one possibility of many for associating the sequence position identifiers with the data units and feedback messages. For example, it is possible to place several data units into one message, where the message e.g. only contains the first sequence position identifier, and a peer receiving said message can then identify the sequence position identifier for each data unit by using the first sequence position identifier and counting the number of data units in the message. Equally, the feedback messages can relate to a plurality of data units, where it can again be sufficient to only indicate the first and/or last sequence position identifier for a sub-sequence of data units to which the feedback message relates.

Now two examples of control methods for controlling the data unit sender 100 shown in FIG. 10 will be described with reference to FIGS. 12 and 13.

Figure 12:
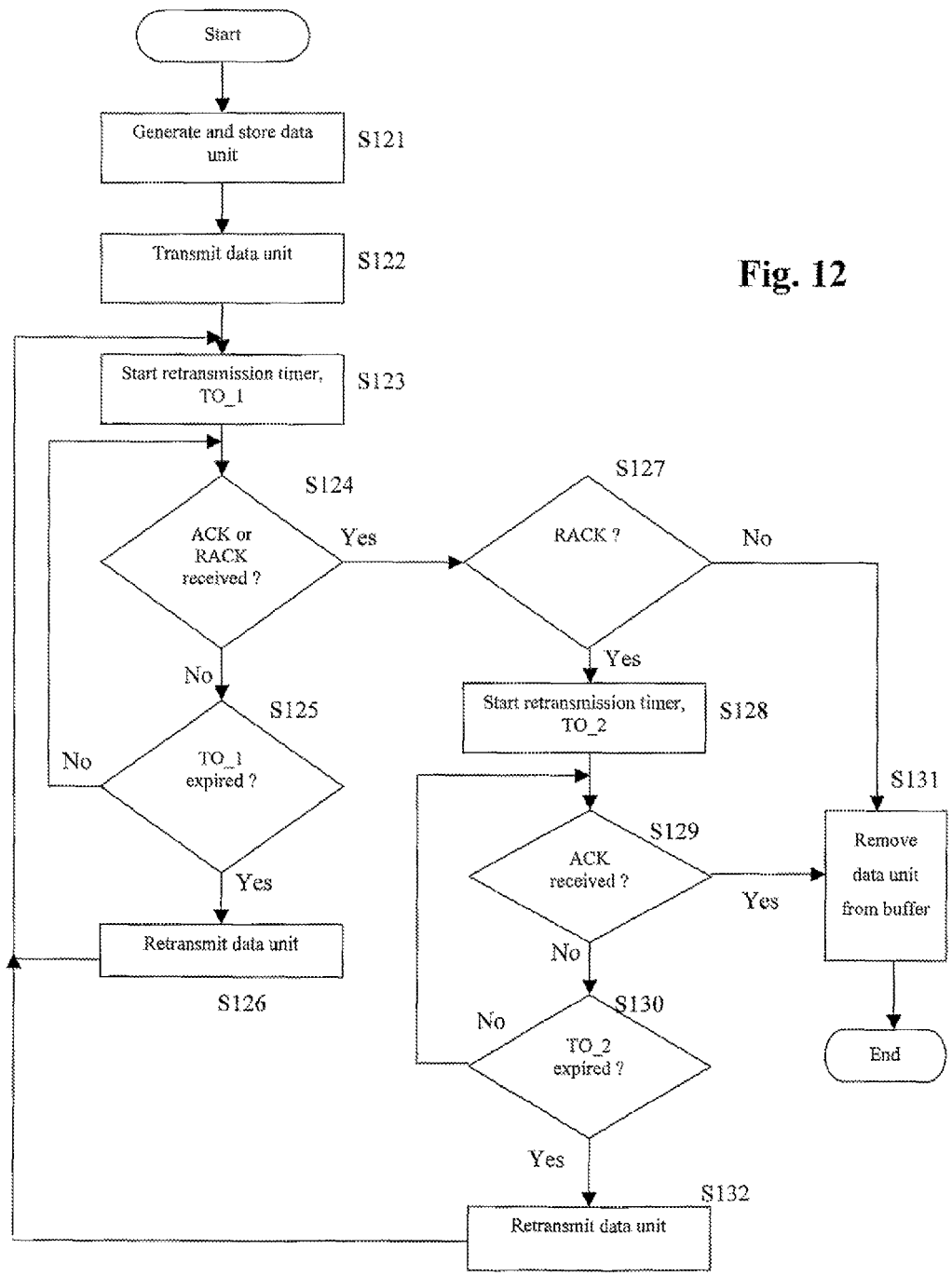
FIG. 12 shows a flowchart of an embodiment of a method for controlling a data unit sender.

FIG. 12 shows a flowchart of a first example of a control method for the data unit sender 100, e.g. implemented in the form of software in control unit 1001. In a first step S121 a given data unit is generated and stored in a buffer 1002. In subsequent step S122 this data unit is transmitted. A specific procedure according to which individual data units are released from the buffer 1002, i.e. the specifics of flow control, can be chosen in any suitable or desirable way. For example, the flow control can be window-based or rate-based. The present invention is independent of the type of flow control used.

In step S123 a re-transmission timer is started to a first time-out period TO_1. Then step S124 determines whether an ACK (second type of receipt information) or a RACK (first type of receipt information) has been received for a sent data unit. If not, step S125 determines whether TO_1 has expired yet. If not, the procedure loops back to step S124, and if the period TO_1 has expired, then the procedure goes to step S126, in which the given data unit is re-transmitted. After step S126, the procedure loops back to step S123.

Steps S123-S126 constitute an example of a first re-transmission control procedure for the given data unit in buffer 1002 that has been sent but for which no RACK has been received.

If step S124 determines that an ACK or RACK has been received for the given data unit, the procedure goes to step S127, in which it is determined whether the received feedback was a RACK. If yes, then a re-transmission timer is started with a second time-out period value TO_2. Then step S129 determines whether subsequently an ACK has been received for the given data unit, i.e. the second type receipt information which indicates that the given data unit was received at the final destination peer. If not, then step S130 determines whether TO_2 has expired, and if not the procedure loops back to step S129. If TO_2 has expired, the procedure goes to step S132, in which the given data unit is re-transmitted. The procedure then loops back to step S123, i.e. treats the re-transmitted data unit as, a data unit for which no RACK has yet been received. Steps S128, S129, S130 and S132 constitute an example of a second re-transmission control procedure for a given data unit if first type receipt information (RACK) has been received for the given data unit.

Finally, if the outcome of step S127 indicates that an ACK has been received in step S124, or if an ACK was received in step S129, then the procedure goes to step S131, in which the given data unit for which the ACK was received is removed from buffer 1002. It is noted that this is only an example, and the overall control procedure can comprise further mechanisms that let a given data unit be held even after an ACK was received.

Such mechanisms are outside of the scope of the present invention and shall not be discussed further here. However, in accordance with the present invention, a given data unit is held in the buffer at least until the ACK (second type of receipt information) that acknowledges receipt at the final destination peer has been received. In this way, despite being able to delegate responsibility to one or more relay peers, the sending peer keeps final control over the end-to-end delivery to the final destination, because data units in the sending peer are not removed until receipt at the final destination has been confirmed. Due to this, the sending peer can always take back responsibility for delivery of data units, such that problems at one or more relay peers do not lead to an irrevocable loss of data units at the level of the communication protocol being described.

In the example of FIG. 12, the first time-out period TO_1 is shorter than the second time-out period TO_2. This is due to the consideration that the first timeout period TO_1 serves to appropriately re-transmit data units on the first hop from the sending peer to the immediately adjacent relay peer. On the other hand, the second time-out period TO_2 serves to enable re-transmission if an end-to-end problem occurs, e.g. in one or more of the relay peers. As the expected end-to-end delivery time is longer than the expected delivery time on the first hop, the second time-out period TO_2 is chosen larger than the first time-out period TO_1.

However, it is also possible to select TO_1 and TO_2 as equal. For example, in situations in which a relay peer sends feedback messages at regular time intervals, TO_1 and TO_2 can be set to the same value.

Optionally, the control unit 1001 and the corresponding control method are arranged such that the first time-out period TO_1 is adapted dynamically based on measurements of a time that passes between a transmission of at least some of the data units 1003 and the receipt of a RACK, and the second time-out period TO_2 is dynamically adapted based on a measurement of a time that passes between a transmission of at least some of the data units 1003 and a receipt of an ACK. For example, the data unit sender can keep an average value of the time between sending a data unit and receiving a corresponding RACK, and an average of the time that passes between the sending of a data unit and the receipt of an ACK, and then dynamically adjust TO_1 on the basis of the average value for receiving a RACK, and TO_2 on the basis of the average value for receiving an ACK. Any known technique for measuring round trip times (RTT) can be used for such measurements.

Figure 13:
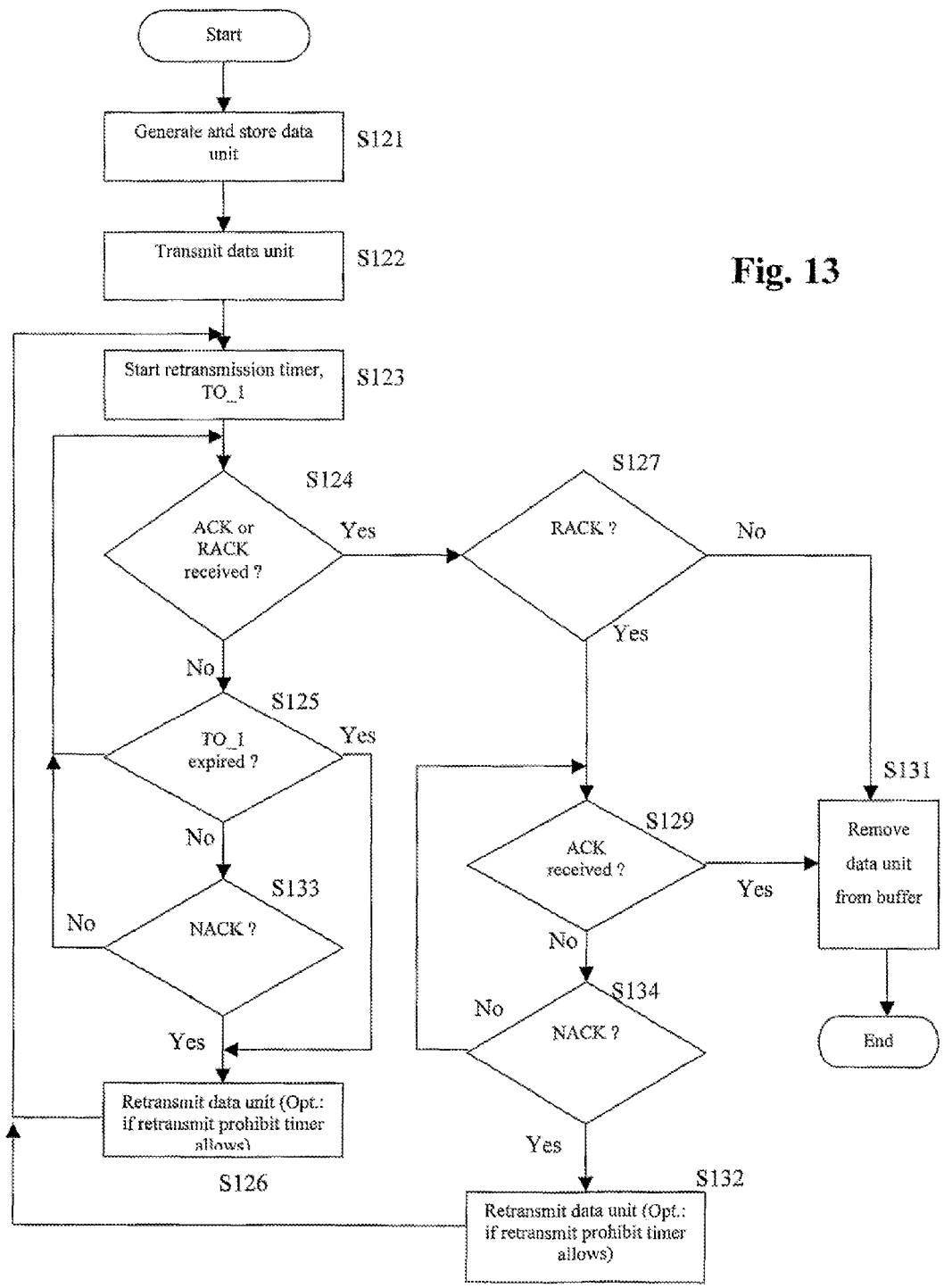
FIG. 13 shows a flowchart of another embodiment of a method for controlling a data unit sender.

FIG. 13 is a flowchart of another embodiment of a control method for controlling the data unit sender 100. In the example of FIG. 13, the communication protocol governing the communication provides for a third type of receipt information that is indicative of an incorrect receipt of a data unit at a peer of the communication protocol. This third type of receipt information will also be referred to as a NACK or negative acknowledgement. An incorrect receipt means that a data unit is not received at all or received with incorrectable errors.

In FIG. 13, the method is the same as that of FIG. 12 with respect to steps S121 to S125, such that a repeated description is not necessary. However, if the outcome of step S125 is negative, i.e. TO_1 has not expired, then the procedure goes to an additional step S133, in which it is determined whether a NACK has been received for the given data unit. If this is the case, the procedure goes to step S126, to re-transmit the given data unit. If no NACK has been received, the procedure loops back to step S124. Steps S123-126 and S133 constitute another example of a first re-transmission control procedure for a given data unit that has been sent but for which no RACK has been received.

If the outcome of step S124 in FIG. 13 indicates that an ACK or RACK has been received, then the procedure goes to step S127, in which it is determined whether a RACK has been received, just like in the method of FIG. 12. If a RACK has been received, then the procedure directly passes to step S129, in order to determine whether a subsequent ACK has been received or not. If not, then it is asked whether a subsequent NACK has been received for the given data unit, see step S134. If no NACK has been received, the procedure loops back to step S129. If a NACK has been received, then the given data unit is re-transmitted in step S132, where after the procedure loops back to step S123, similar to the procedure in the example of FIG. 12. Steps S129, S134 and S132 constitute another example of a second re-transmission control procedure for a given data unit for which the first type receipt information (RACK) has been received.

Finally, just as in the example of FIG. 12, if the outcomes of steps S127 and S129 indicate that an ACK has been received, then the corresponding data unit may be removed from the buffer in step S131.

In FIG. 13, steps S126 and S132 indicate the optional use of a retransmission prohibit timer. A retransmission prohibit timer can be triggered by a selected event, such as the transmission of a data unit and/or the retransmission of a data unit. Within the retransmission prohibit time period, a retransmission is prohibited. If the peers of the present invention are operated such that feedback messages are sent at regular intervals, then it is preferable to employ a retransmission prohibit timer, in order to avoid unnecessary retransmissions, e.g. to avoid unnecessary retransmissions each time that a RACK is received. When combining a retransmission prohibit timer feature with a retransmission time-out feature, the retransmission time-out period (such as TO_1 or TO_2) is set longer than the retransmission prohibit period. In other words, steps S126 and S132 can be implemented in such a way that a retransmission is in any case conducted if the procedure progresses to these steps, or a retransmission is only conducted if the retransmission prohibit time period has additionally expired. If the steps S126 or S132 are reached because of a time-out of a retransmission time-out period, then the retransmission prohibit time period will have expired, but if these steps are reached on account of a NACK, then the retransmission prohibit time period may not yet have expired.

The effects of the example of FIG. 13 are the same as in FIG. 12. Namely, a first and a second re-transmission control procedure for a data unit are provided, the first dealing with reliable delivery of the first hop to a relay peer, and the second dealing with end-to-end delivery, where the triggering of the respective different re-transmission control procedures is based upon having received the first type receipt information (RACK) for a given data unit or not. Also, the given data unit is held in the buffer at least until the second type receipt information (ACK) has been received. Thereby, the data unit sender is capable of always taking back responsibility for a delivery of a data unit, even if this responsibility had previously been temporarily passed to a relay peer.

It is noted that in the above discussion it was generally assumed that the adjacent peer to the sending peer is a relay peer. However, it is important to note that the next peer can also already be the final destination peer. In this case, the data unit sender and corresponding control method of the present invention will automatically fall back into a standard ARQ procedure, because the final destination peer will directly send ACKs to the sending peer. Such operation requires absolutely no adjustment in the sending peer of the invention. This is an important advantage of the invention.

Regarding the examples of FIGS. 12 and 13, it is noted that variations are naturally possible. For example, it is also possible to combine the feature of the second time-out period TO_2 (as shown in FIG. 12) with the concept of re-transmission upon receiving a NACK (step S134 in FIG. 13).

Now a schematic representation of an embodiment of a data unit relay device of the invention will be described with reference to FIG. 11.

The data unit relay device 110 comprises a data unit buffer 1102 for holding receive data units 1102 of a communication protocol received from a sender-side peer of that protocol, and for holding send data units 1103 of the communication protocol to be sent to a receiver-side peer. The sender-side peer can be an original sending peer (as e.g. described in FIG. 10) or another relay device placed between the original sender and the relay device 110 of FIG. 11. Equally, the receiver-side peer can be the final destination peer, or another relay peer provided between data unit relay device 110 and the final destination peer.

Data relay device 110 has a control unit 1101, which is arranged to control a receiving of the receive data units 1102, a transmission of the send data units 1103, a processing of receiver-side feedback messages 1104 received from the receiver-side peer, a re-transmission of the send data units 1103 to the receiver-side peer based on the receiver-side feedback messages 1104, a transmission of sender-side feedback messages 1105 to the sender-side peer, and the overall management of the buffer, as a relay peer of the given communication protocol. The "management of the buffer" means the placing of data units in the buffer and the removing of data units from the buffer.

The buffer can be any type of memory suitable for holding data units, and the control unit can equally be any device suitable for performing the control functions, e.g. the control unit can be a programmable processor.

As already described in connection with the sender in FIG. 10, the communication protocol is such that the receive data units 1102 are arranged in a sequence, and each receive data unit 1102 is identified by a sequence position identifier, indicated as n, n+1, n+2 in FIG. 11. The send data units 1103 are arranged in the same sequence, such that for each receive data unit 1102 there is a corresponding send data unit 1103 having at least a same payload section and the same sequence position identifier. Preferably, the receive data units and send data units not only have the same payload section and the same sequence position identifier, but are in fact identical. This simplifies buffer management, as the buffer 1102 then only holds the received data units and appropriately forwards them, without the action of copying parts of data units, which may lead to errors.

The sender-side feedback messages 1105 and the receiver-side feedback messages 1104 use the sequence position identifier and carry information as already described in connection with the sender of FIG. 10. Namely, the communication protocol provides for at least a first type and second type of receipt information, where the first type (RACK) is indicative of a correct receipt at a data unit relay device, and the second type is indicative of a correct receipt at the final destination peer.

The control unit 1101 is arranged to send a sender-side feedback message carrying the first type of receipt information (RACK) for a given receive data unit 1102 that was correctly received. This is e.g. shown by the sender-side feedback message 1105 carrying an R for sequence position identifier n+2.

The control unit 1101 is furthermore arranged to perform a re-transmission control process for a given send data unit 1103 in the buffer 1102 that has been sent, based on the receiver-side feedback messages 1104.

The control unit 1101 is furthermore arranged to hold a given send data unit 1103 in the buffer 1102 until a predetermined deletion condition is fulfilled. One such possible deletion condition is the receipt of a receiver-side feedback message 1104 providing the second type of receipt information (ACK) for the given data unit.

The control unit 1101 is furthermore arranged such that after having received the second type of receipt information (ACK) for a given sequence position identifier in a receiver-side feedback message 1104, a corresponding sender-side feedback message 1105 is sent to the sender-side peer, carrying the second type of receipt information (ACK) for the given sequence position identifier. This is shown in FIG. 11 in terms of the receiver-side feedback message 1104 carrying an A (for ACK) for sequence position identifier m, such that the data unit relay device 110 then sends the sender-side feedback message 1105 that equally carries an A (for ACK) for said sequence position identifier m.

Examples of parts of the control method for controlling the data unit relay device 110, e.g. executed as software in control unit 1101, will now be explained with reference to FIGS. 14a-14c.

Figure 14B:
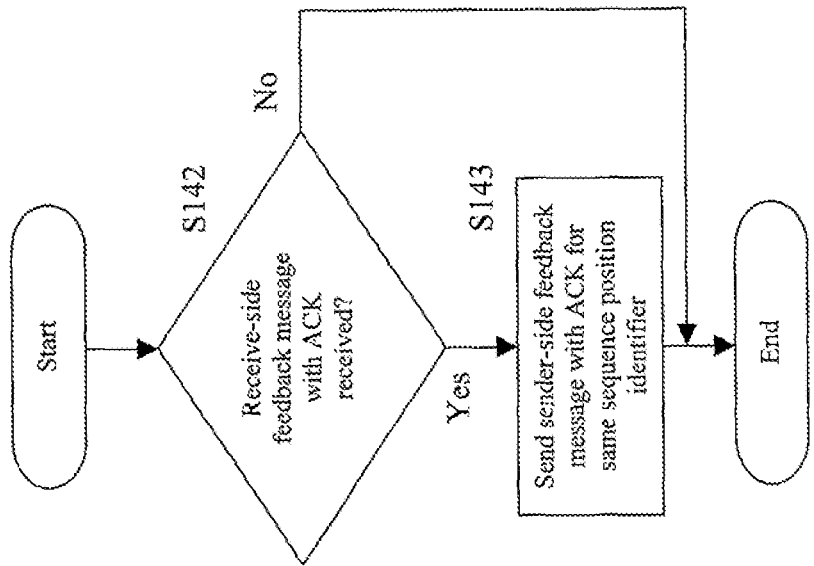
FIG. 14a-c show flowcharts describing parts of a method embodiment for controlling a data unit relay device.
Figure 14A:
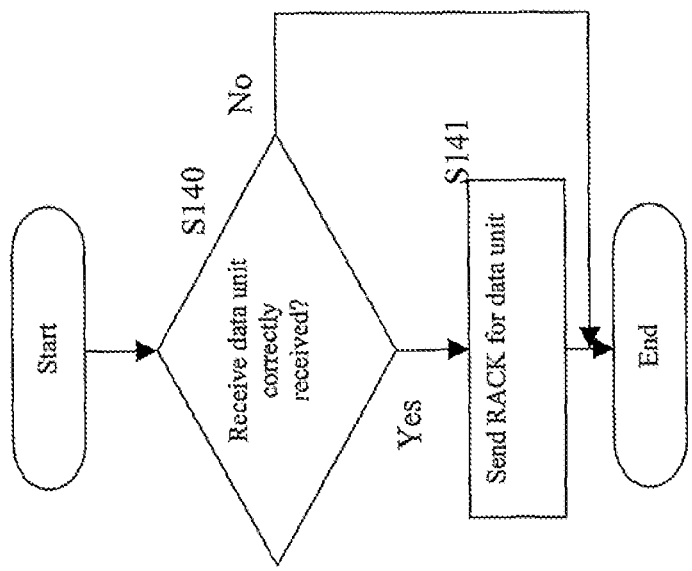

FIG. 14a shows a procedure, where if a sender-side data unit 1102 is correctly received, step S140 branches to step S141, in which a corresponding RACK is sent for the given data unit, i.e. for the sequence position identifier of said data unit.

FIG. 14b shows a flowchart of a process for generating a sender-side feedback message with an ACK, if a receiver-side feedback with an ACK is received. Namely, step S142 determines whether a receiver-side feedback message with an ACK for a particular sequence position identifier has been received, and if this is the case, step S143 sends a sender-side feedback message with an ACK for the same sequence position identifier.

Figure 14C:
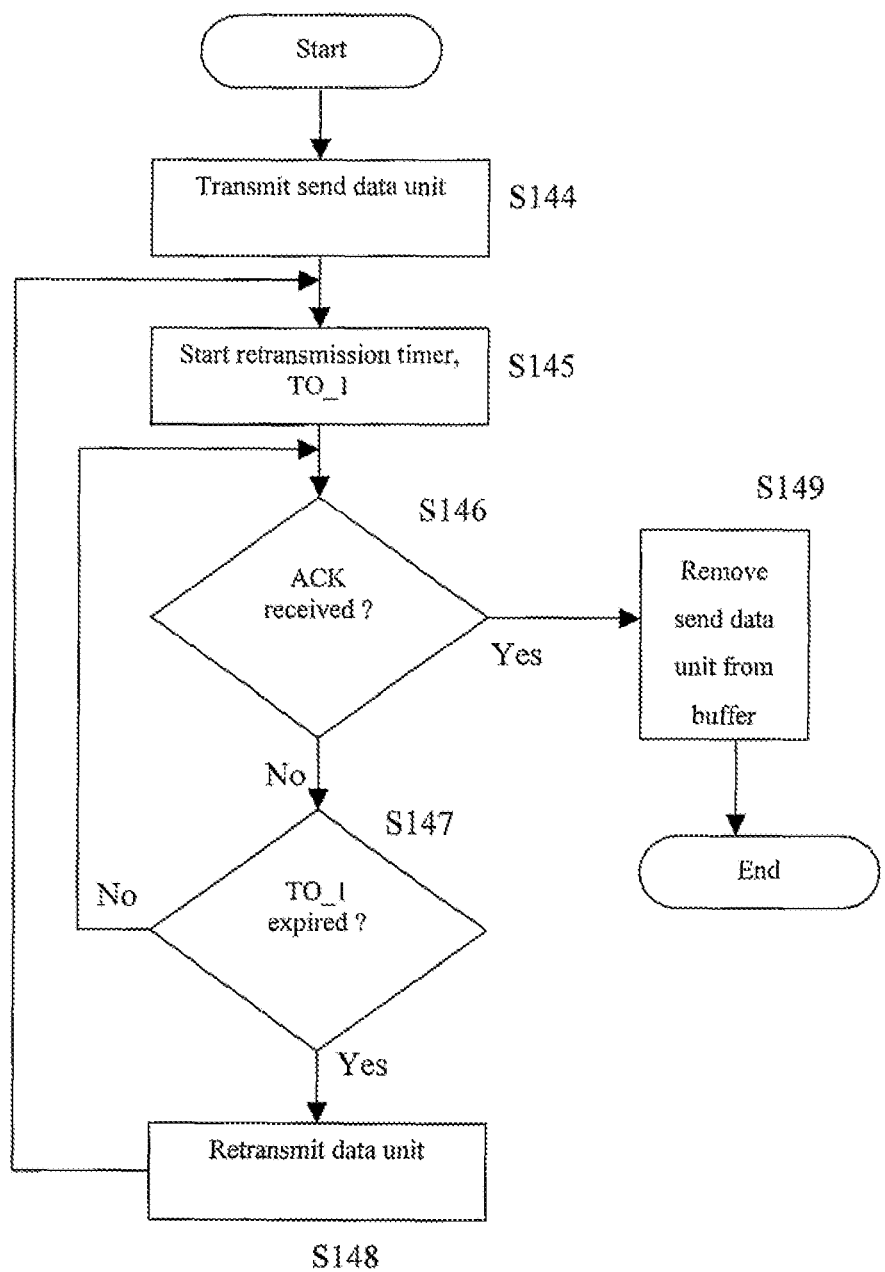

FIG. 14c shows an example of a procedure for performing a re-transmission control process for transmitted send data units. In a first step S144, a send data unit 1103 is transmitted. Thereafter, in step S145, a re-transmission timer is set to a time-out period TO_1. The procedure then determines whether an ACK (second type receipt information) has been received, see step S146. If not, it is determined in step S147 whether TO_1 has expired. If not, the procedure loops back to step S146. If yes, then a re-transmission of the given send data unit is performed in step S148, and the procedure loops back to step S145. If step S146 indicates that an ACK has been received, then the send data unit for which the ACK has been received is removed from the buffer 1102 in step S149. Receiving an ACK is an example of a deletion condition for a data unit. However, other deletion conditions can also be chosen. For example, it is also possible that, upon placing a given data unit into the buffer 1102, a purge timer is set to a predetermined purge time period, and if said purge time period expires, the corresponding data unit is simply removed from the buffer. This has the purpose of avoiding the indefinite buffering of data units for which no second type receipt information has been received. Another deletion condition is the receiving of an indication that the sending peer has actually received the feedback message that forwards the ACK.

Furthermore, it is noted that FIG. 14c is an example of a re-transmission control process that does not involve RACKs. Namely, the re-transmission procedure for send data units 1103 can be chosen in any way suitable for the given situation. If the data unit relay device 110 is arranged such that the send data units 1103 are directly sent to the final destination peer, then the re-transmission control procedure only needs to take ACKs into account.

Figure 11:
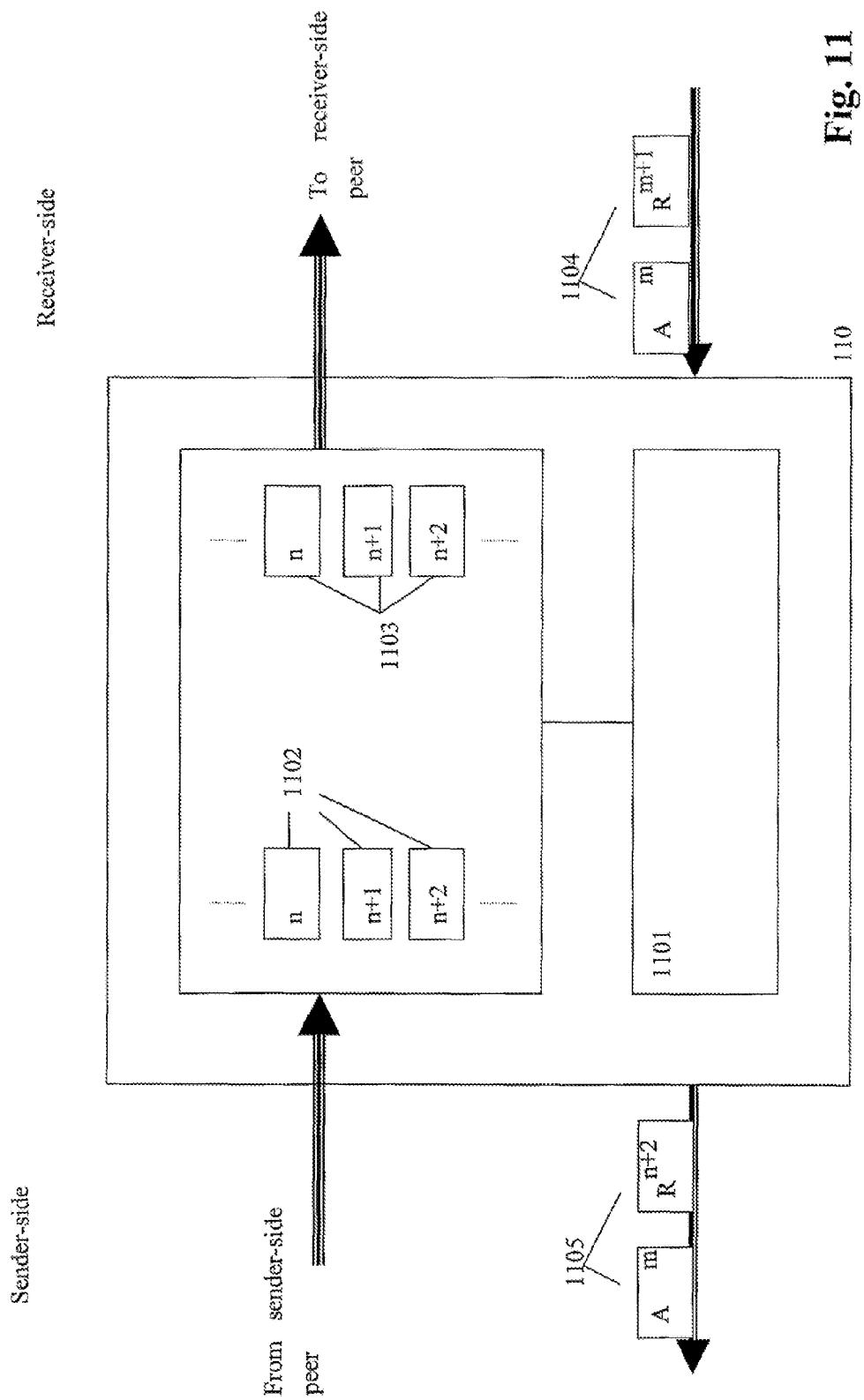
FIG. 11 shows a schematic diagram of a data unit relay device.

On the other hand, in the more general case that the data unit relay device 110 transmits send data units 1103 to another data unit relay device, then it is preferable that the re-transmission control process executed at the data unit relay device 110 of FIG. 11 also processes the first type receipt information, i.e. RACKS. The basic arrangement of the control unit 1101 with respect to send data units 1103 can then be the same as that of control unit 1101 of sender 100 with respect to the data units 1003 sent by data unit sender 100. As a consequence, the control unit 1101 of data unit relay device 110 can e.g. implement the control procedures described in FIGS. 12 and 13 with respect to the send data units 1103. A renewed description of these procedures is therefore not necessary.

If the underlying communication protocol provides for the above described third type of receipt information, i.e. a NACK that is indicative of an incorrect receipt of a data unit at a peer of the communication protocol, then the control unit 1101 of data unit relay device 110 is preferably arranged in such a way that if a receiver-side feedback message 1104 is received that carries this third type of receipt information for a sequence position identifier for which no data unit 1103 or 1102 is stored in said buffer, a sender-side feedback message 1105 is sent that carries this third type of receipt information for that sequence position identifier. In other words, the data unit relay device and the corresponding control method are arranged such that if a NACK is received for a data unit that is not present in the relay devices buffer, then this NACK is forwarded to the next peer in the overall direction of the end-to-end sender. Furthermore, the data unit relay device and corresponding control method are also preferably such that if in response to such a forwarded NACK, a corresponding sender-side data unit 1102 is received (i.e. the previous peer has retransmitted the NACKed data unit), then the send control on the receiver-side should be such that a corresponding send data unit 1103 is transmitted.

When using the above-mentioned feature of forwarding NACKs, the following benefit can be achieved. If for whatever reason a data unit relay device does not have certain data units in its buffer (one reason could be that the data unit relay device has just been introduced into the communication by a handover process and is therefore just beginning to receive sender-side data units 1102, but is nonetheless also already receiving receiver-side feedback messages 1104), then the overall ARQ mechanism still functions without any problems. Namely, if the data unit relay device does not have a particular data unit present for which a NACK has arrived, such that it cannot itself perform a re-transmission for this data unit, it simply forwards the NACK towards the next possible sender. If no data unit relay device along a given path is capable of re-transmission, because the data unit is lacking in each respective buffer, then the NACK will finally arrive at the original sending peer. If the original sending peer has not yet received an ACK for that data unit, then it can simply be re-transmitted. This is an example of the sending peer taking back the responsibility for reliable transmission if problems occur in one or more data unit relay devices. Naturally, if the sending peer has previously received an ACK for the given data unit, then the forwarded NACK can simply be ignored.

Regarding the processing of RACKs received in receiver-side feedback messages, the data unit relay device can be arranged in any suitable or desirable way. For example, it is possible that received RACKs are never forwarded, in order to avoid unnecessary data traffic. On the other hand, it is equally well possible to always forward RACK information towards the sender-side. This can e.g. be useful to provide the sending peer with more information on the progress in moving a data unit over a series of relay peers (each RACK message is an indication that the data unit has moved one hop forward), or it can also be useful if the feedback messages are collective feedback messages that relate to a plurality of data units. In this case, the feedback messages constitute a type of status report on a number of data units, and for each data unit identified the feedback messages preferably indicate one of the first to third receipt information, i.e. either a RACK, an ACK or a NACK. Such collective feedback messages will be discussed in more detail further on.

It is also possible to perform a forwarding of RACKs in such a way that if a receiver-side feedback message carrying a RACK for a given sequence position identifier is received, a corresponding sender-side feedback message with a RACK for said given sequence position identifier is only then sent, if there is no corresponding data unit having said given sequence position identifier stored in the buffer 1102. The usefulness of this feature lies in the fact that if a given data unit is present in the buffer 1102 of the data unit relay device 110, then this means that a RACK for said data unit has already been sent previously. A repeated RACK is avoided. However, if there is no corresponding data unit in the buffer 1102 of data unit relay device 110, then it is possible that the source of the data unit has not yet been informed of the correct receipt at a relay peer such that the forwarding of the RACK is useful.

Now a plurality of examples will be described in somewhat more detail.

Figure 1:
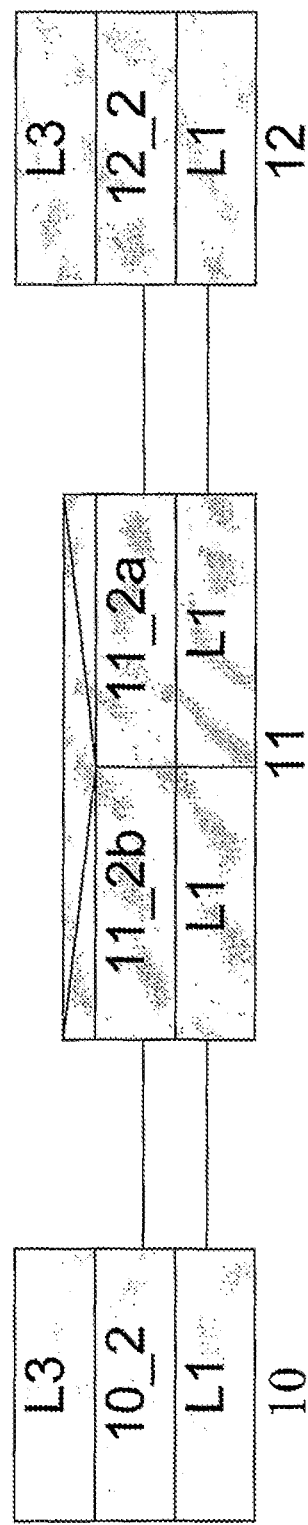
FIG. 1 shows a basic protocol architecture of the known split connection concept.
Figure 2:
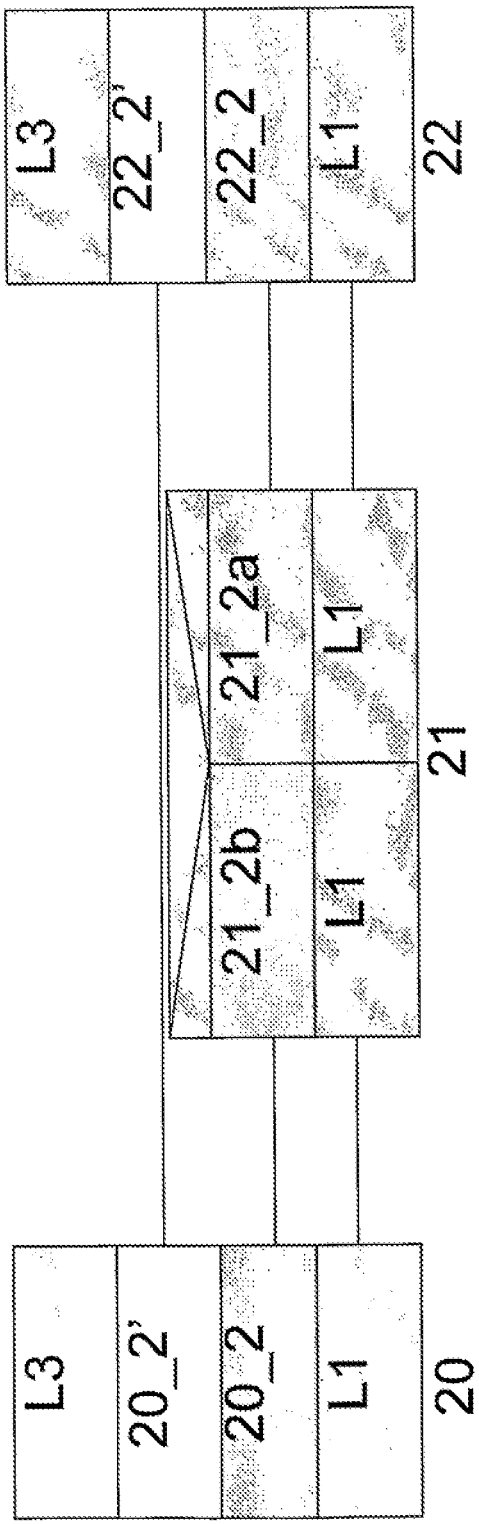
FIG. 2 shows the basic protocol architecture of the known sub-layering concept.
Figure 3:
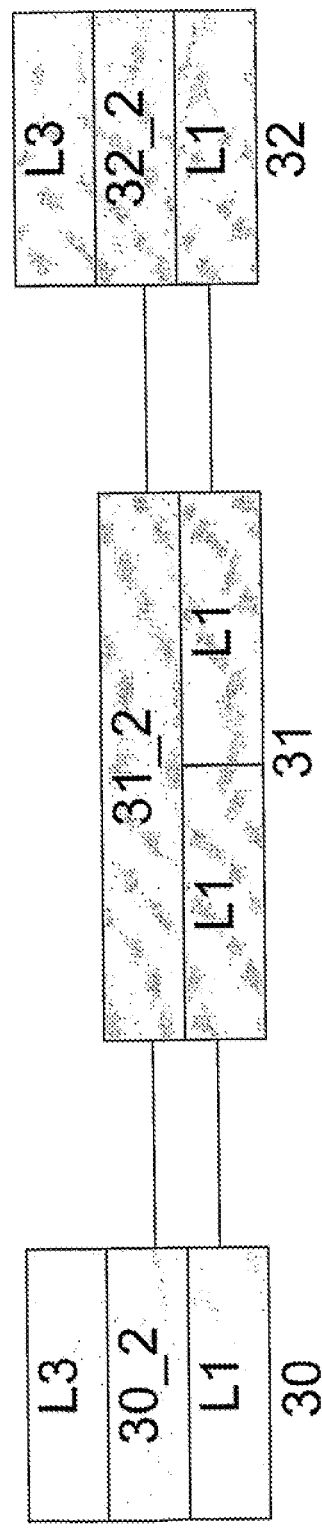
FIG. 3 shows a link layer example of the basic protocol architecture of the present invention.
Figure 4:
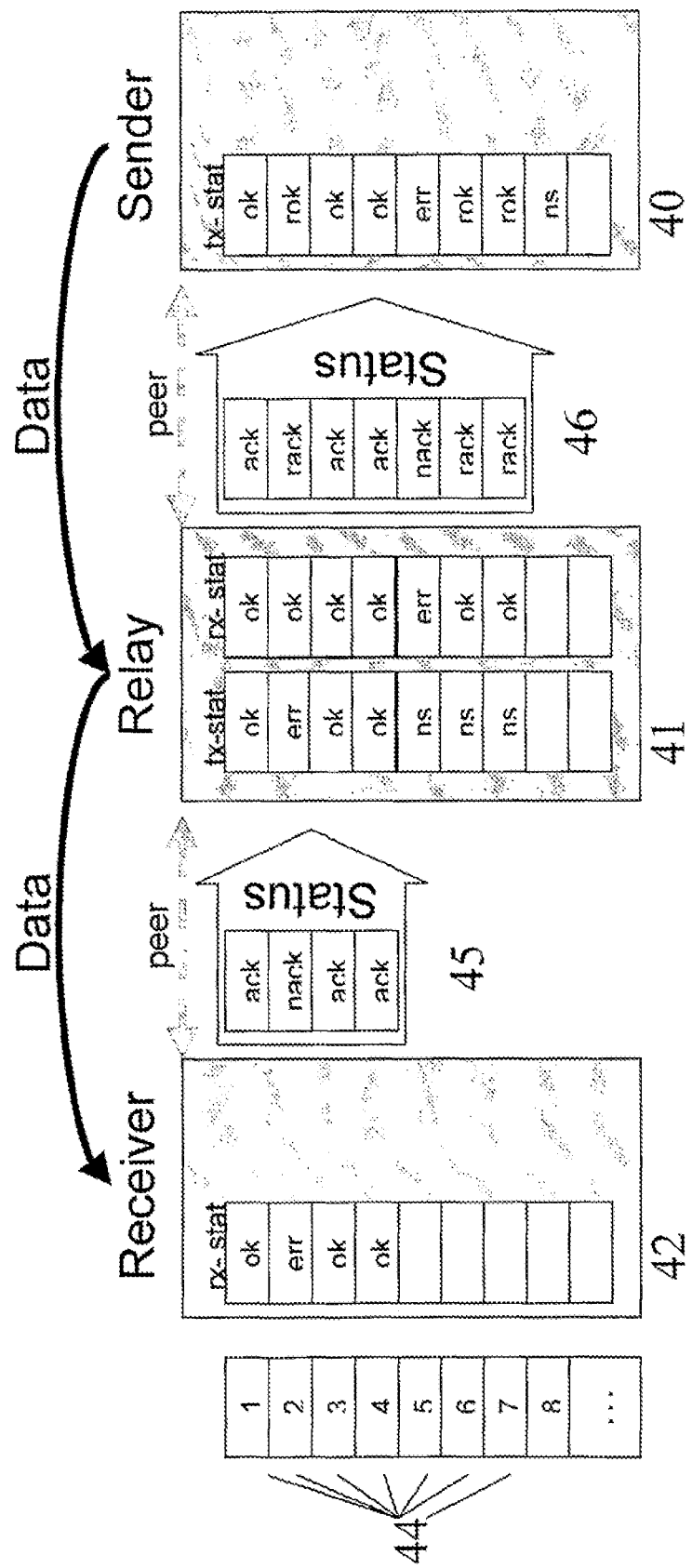
FIG. 4 schematically shows an example of a communication in accordance with an embodiment of the present invention.

FIG. 4 shows a system comprising a sender 40, a relay 41 and a receiver 42. Each of the devices implements a peer of the inventive communication protocol. The sender 40 is an example of the data unit sender described in connection with FIG. 10, and relay 41 is an example of the data unit relay device 110 described in connection with FIG. 11. On the left-hand side of FIG. 4, the sequence of data units 44 is shown, each represented together with an integer that stands for the sequence position identifier. The arrows at the top of FIG. 4 indicate the flow of data units from the sender to the relay and from the relay to the receiver, without providing further detail.

The sender 40, relay 41 and receiver 42 each keep a respective transmission and/or reception status with respect to the sequence of data units 44. The receiver 42 sends feedback messages 45 to the relay 41, and the relay 41 sends feedback messages 46 to the sender 40. These feedback messages 45, 46 are collective status reports for a group of data units. For example, feedback message 45 associates data unit 1 with an ACK, data unit 2 with a NACK, and data units 3 and 4 with an ACK, respectively. This corresponds to the receiver status of receiver 42, namely where "ok" indicates correct receipt, and "err" indicates, incorrect receipt.

Based on status message 45, the relay device 41 keeps a corresponding transmission status, i.e. the status on the successful or unsuccessful transmission of send data units (see 1103 in FIG. 11). The symbol "ns" stands for not sent.

Relay device 41 furthermore keeps a receiver status, in which data units 1-4 are correctly received ("ok"), just like data units 6 and 7, whereas data unit 5 was not correctly received. Accordingly, the feedback message 46 contains ACKs for data units 1, 3 and 4, because these were already successfully acknowledged by the receiver 42. In other words, the sender-side feedback message 46 forwards the acknowledgements for data units with sequence position identifiers 1, 3 and 4. On the other hand, the feedback message 46 contains RACKs for data units 2, 6 and 7, because these data units were successfully received by the relay 41, but, not acknowledged by the receiver 42, i.e. the final destination peer. Finally, the feedback message 46 carries a NACK for data unit no. 5, because this data unit was not successfully received at the relay 41.

The sender 40 maintains a transmission status that is based upon the information received in the feedback message 46. Namely, data units for which an ACK was received or marked as "ok", those for which a RACK was received are marked as "rok", and those for which a NACK was received or for which no feedback was received within the corresponding time-out period are marked as "err". In the example of FIG. 4, the sender 40 could at the shown state of transmission remove data units no. 1, 3 and 4, as these are known to have been successfully received at the final destination peer in receiver 42.

The first, second and third type receipt information can be coded in any suitable or desirable way. For example, two bits are sufficient to code the three different types. The feedback messages can therefore combine an appropriate receipt type bit value with the sequence position identifier for a given data unit. The coding used by the sender, relay and receiver for keeping a transmission and/or receive status can equally be chosen in any suitable or desirable way. For example, the four states ok, rok, err and ns can be coded by two bits.

In the example of FIG. 4, the relay peer in device 41 is operated such that if a receiver-side feedback message with a NACK is received, and the corresponding data unit has a receive status at 41 of err, then the NACK is forwarded to the sending peer in sender 40, and as soon as the data unit retransmitted by the sending peer has been received locally at device 41, it is transmitted to the peer in receiver 42. If a receiver-side feedback message with a NACK is received, and the corresponding data unit has a receive status at 41 of ok, then the relay peer in device 41 performs the corresponding retransmission. If a receiver-side feedback message with a RACK is received, and the corresponding data unit has a receive status at 41 of ok, then the relay peer in device 41 forwards the RACK to the sending peer in 40 in the next status report. Finally, if a receiver-side feedback message with an ACK is received, then the relay peer in device 41 forwards the ACK to the receiving peer in the next status report.

The relay device 41 can perform in-order delivery with respect to the sequence of data unit 44, or out-of-order delivery. Preferably, the relay device performs out-of-order delivery, i.e. relays receiver-side data units 1103 (see FIG. 11) as they are available, irrespective of the order of the sequence. Correspondingly, the receiver 42 preferably has a re-sequencing functionality.

Figure 5:
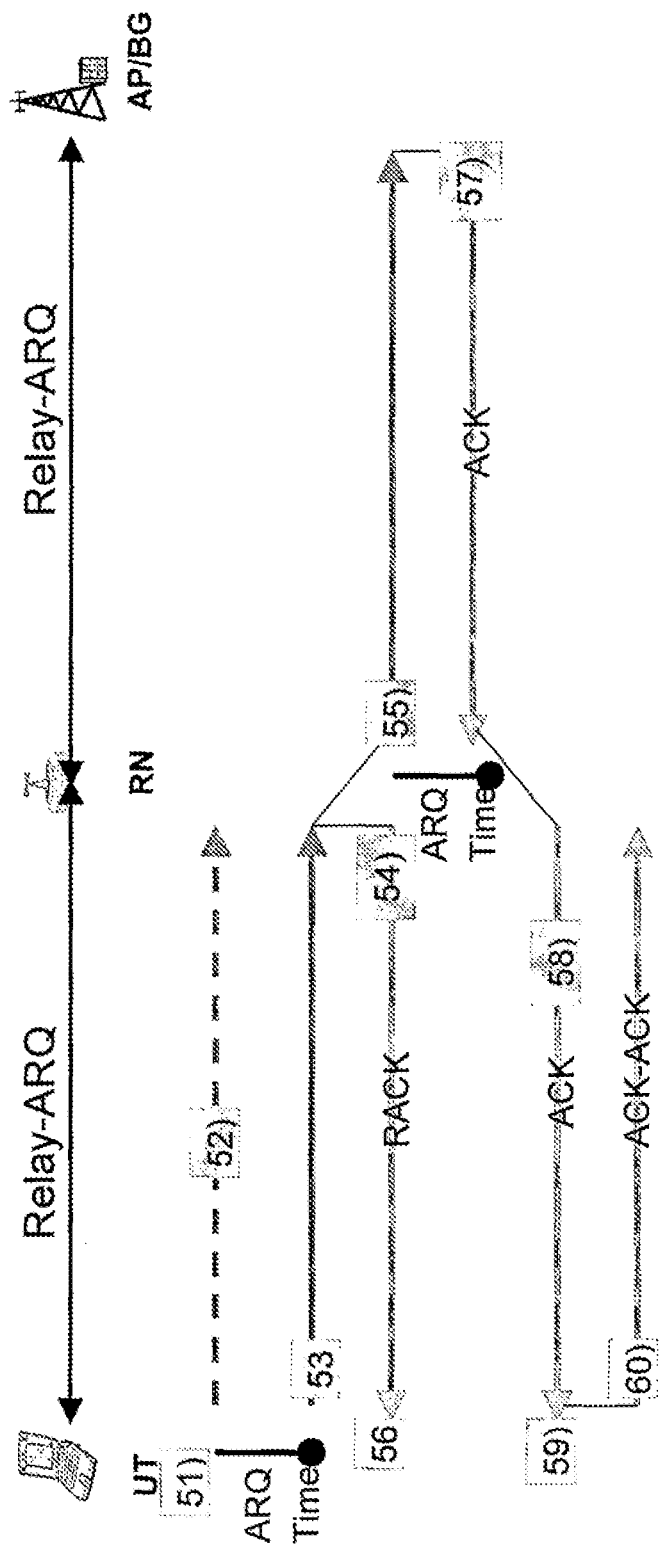
FIG. 5 schematically shows a specific data unit and message exchange in an embodiment of the present invention.

FIG. 5 shows an example of a data unit transmission at the link layer between a user terminal UT and a network access point AP, via a relay node RN. At 51) the UT sends one data unit to the RN and starts a time-out timer. At 52) the data unit is lost on its way to the RN. At 53) no RACK or ACK arrives at the ARQ transmitter in time, such that the timer times-out and the data unit is re-transmitted. At 54) the data unit arrives at the RN and triggers the sending of a RACK. At 55 the data unit is delivered to the AP and another timer is started locally in the RN, in order to provide a re-transmission over the link from RN to AP in case of a data unit loss there. At 56) the UT receives the RACK and therefore knows that the responsibility for further delivery of the data unit is at least temporarily delegated to the RN. At 57) the AP successfully receives the data unit and replies with an ACK, i.e. the second type of receive information. At 58) the ACK received at RN is forwarded to the UT. At 59) the UT receives the ACK and consequently is informed that the data unit has been correctly delivered to the destination point. 60) indicates an option according to which the UT (generally the sending peer) sends an indication to RN (in general the next peer in direction of the receiver) that the ACK has successfully reached the sender. This is sometimes also called an ACK-ACK.

The usefulness of such ACK-ACKs is to let the data unit relay device finally release data units from its buffer. Therefore the receipt of such an ACK-ACK from the sender-side is another example of a deletion condition as explained in connection with FIG. 11. Preferably, each relay device is arranged to forward such an ACK-ACK in receiver direction, i.e. to the next receiver-side peer. In this way each peer of a chain is informed of the fact that the sending peer has been informed of the successful end-to-end transmission, such that the corresponding data unit can now certainly be removed from the respective local buffer.

Figure 6:
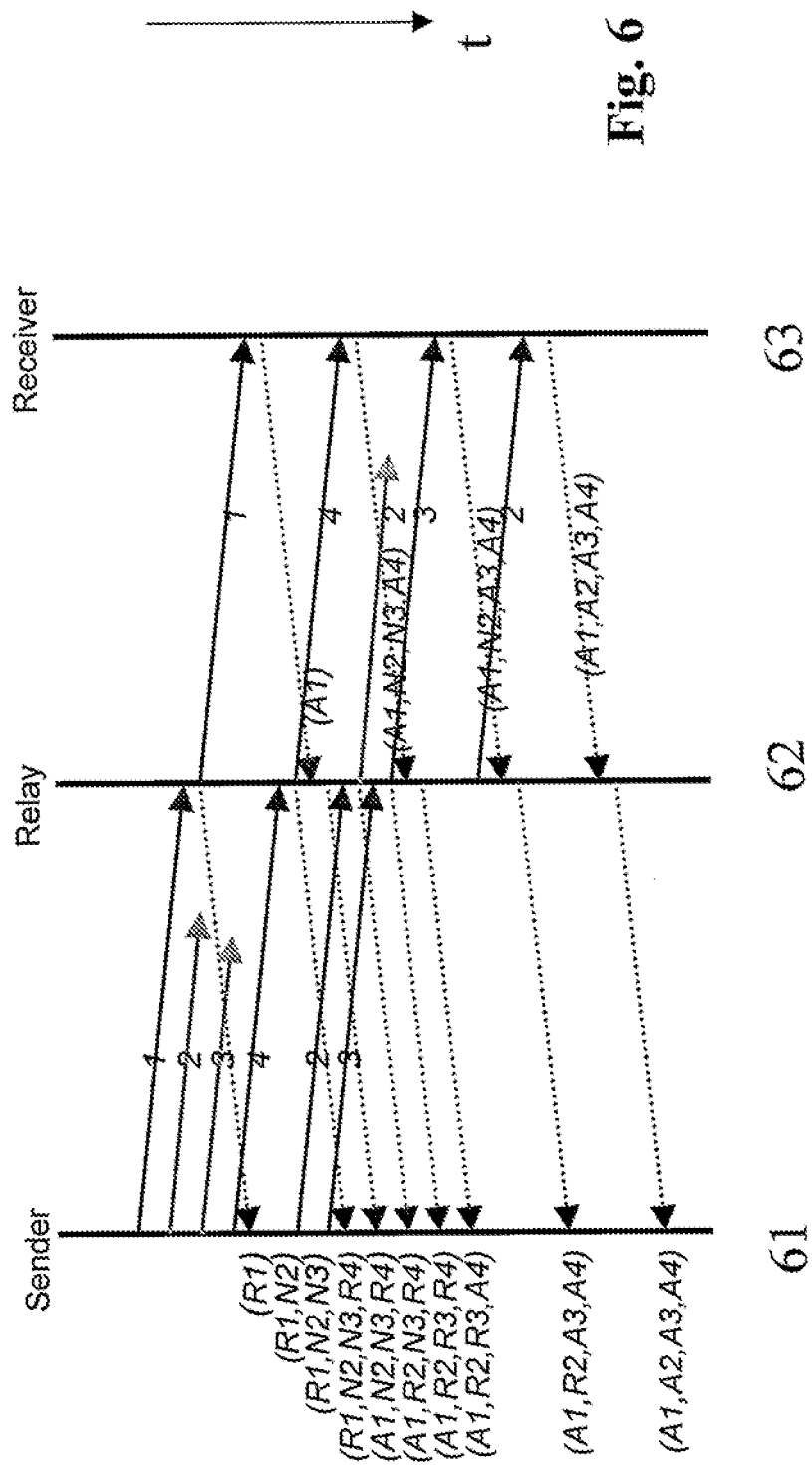
FIG. 6 shows a further example of an embodiment of the present invention.

FIG. 6 shows another example, in which four data units carrying identifiers 1, 2, 3 and 4 are sent from a sender 61 to a receiver 63 via a relay 62. The relay node 62 in-between forwards the data units as soon as it receives them, i.e. performs out-of-order delivery. Both the relay 62 and the receiver 63 send feedback messages to the respective peer in sender direction, to inform the peer about successfully or unsuccessfully received data units.

In this example, a status message is sent whenever the respective peer receives a correct data unit. Although this is a preferable embodiment, it is by no means a necessity. For example, feedback messages can be sent at regular intervals or at both regular intervals and whenever a correct data unit is received.

In the example of FIG. 6, the first re-transmission control procedure (re-transmission control procedure for a given data unit that has been sent but for which no RACK has been received) and the re-transmission control process at the relay use a time-out value in the order of one round trip time RTT for the respective hop from sender 61 to relay 62, or relay 62 to receiver 63.

In the shown example, sender 61 sends data units 1, 2, 3, 4 one after the other. Data units 2 and 3 are lost on their way to relay 62. When relay 62 receives data unit no. 1, it sends a RACK to sender 61 and forwards data unit 1 to receiver 63. When data unit 1 arrives at receiver 63, an ACK (see message (A1)) is sent by receiver 63 to relay 62. In the example of FIG. 6, relay 62 does not immediately forward the ACK for data unit no. 1, but much rather waits until another data unit arrives from the sender, to then send a collective feedback message. Naturally, the data unit relay device of the present invention could also be implemented in such a way that receiver-side acknowledgements are immediately forwarded to the sender-side.

In the example of FIG. 6 the numbers attached to arrows simply identify a corresponding data unit. These numbers are sequence numbers, i.e. an example of a sequence position identifier. The indications in parentheses attached to feedback messages are to be read in the following way: an A followed by a number indicates an ACK for the data unit of said number, an N followed by a number indicates a NACK for said number and an R followed by a number is a RACK for said number. The transmission status confirmation written on the left-hand side for sender 61 is such that R followed by a number indicates a rok for the data unit of said number, N followed by a number indicates an err for the data unit of said number (i.e. that a NACK was received for said data unit or no feedback was received within the applicable time-out period), and A followed by a number indicates an ok for the data unit of that number. The same nomenclature will be used in the examples of FIGS. 7 and 8 as well.

Returning to the example of FIG. 6, the sender 61 updates its transmission status at first to (R1), due to receiving a RACK for data unit number 1. Thereafter, due to not receiving any feedback for sent data units 2 and 3, the status is updated to err for data units number 2 and 3. Due to the time-out, data units 2 and 3 are retransmitted by sender 61. Relay 62 receives data units 2 and 3, and forwards them. In the example of FIG. 6, data unit 2 is lost on the hop from relay 62 to receiver 63, but data unit 3 is correctly delivered. Accordingly, the receiver acknowledges the receipt of data unit number 3 (see feedback message (A1, N2, A3, A4)). Relay 62 retransmits data unit number 2 due to a time-out. After data unit 2 is correctly received at receiver 63, an appropriate feedback message is sent that finally acknowledges all four data units. It can also be seen in the example of FIG. 6 how the relay 62 appropriately forwards the ACKs from receiver 63 to sender 61, and sends RACKs for the data units that it locally receives.

In accordance with the present invention, a system and method are provided for a reliable transport for data units over a multi-hop connection, which system and method are very simple, but at the same time provide full reliability. These are not the only advantages of the present invention.

In accordance with the present invention, it is very simple to perform a transition from one relay device to another, e.g. in a handover. Due to the fact that the sending peer retains the overall responsibility for end-to-end delivery, it is not necessary that the old relay device performs a transfer of state information to the new relay device. In other words, data units that were already received by the old relay but not yet successfully forwarded to the receiving peer can be assumed to be lost, without this affecting the end-to-end reliability. Namely, the sending peer of the invention can take back the responsibility for these data units and ensure end-to-end delivery.

The process of switching from one relay device to another can be done in any suitable or desirable way, and can e.g. be performed in accordance with any known handover procedure such that a further description is not necessary here.

As soon as the new relay device receives the first data units from the sender-side, it can begin to build up an appropriate receive state, and equally when it begins to receive feedback messages from the receiver-side, it can accordingly begin to build up a transmission state. Furthermore, the relay device generates its own feedback messages to be sent towards the sender-side, to report on the state of the receiver-side of the relay device (namely by appropriately forwarding ACKs and/or NACKs), and on its own receive status.

By appropriately forwarding receiver-side feedback information to the sender-side, for data units that the new relay device itself has never received, the peer(s) on the relay device's sender-side (e.g. in the simple two-hop case of sending peer, one relay peer and receiving peer, there is only one sender-side peer for the relay, namely the sending peer itself) are appropriately informed of the correct receipt of data units at the receiver, namely through forwarded ACKs, or of data units not having been correctly received, namely by NACKs. In the event of forwarding a NACK, the new relay device expects to receive a retransmission for the corresponding data unit, and will forward the thus transmitted data unit once is arrives. On the other hand, if the new relay device forwards an ACK, it does not expect to receive any further communications with respect to that data unit, except possibly for ACK-ACKs as described in connection with the example of FIG. 5. As discussed in connection with FIG. 5, the use of ACK-ACKs is an option.

As a result, the concept of the present invention can ensure a seamless transition from an old relay device to a new relay device without requiring any complicated transfers of state information between the old relay and the new relay. Much rather, the use of first type and second type receipt information, and preferably also third type receipt information as described above, together with the appropriate relaying of this receipt information in feedback messages, provides for reliable transmission.

Effectively, each peer that transmits data units can delegate the responsibility for retransmissions to the next peer in the chain from sender to receiver as soon as this next peer has sent a RACK for a given data unit. If the next peer becomes obsolete for any reason, the peer can take back the responsibility. The ultimate responsibility can be taken back by the sending peer, i.e. the first peer in the chain.

Preferably, each peer that transmits data units (i.e. the sending peer, and each relay peer) implements a mechanism to check whether the next peer in the chain is still valid or acting. This can be done in any suitable or desirable way. For example, peers connected over one hop can exchange polling messages on an event basis or in predetermined time intervals. Or each peer that receives data units can regularly send alive signals to the preceding peer in the chain. As another possibility, each peer that transmits data units can treat a hop to a next peer as dead if no feedback at all is received within a given time period, e.g. a predetermined number of retransmission time-out periods for the given hop. Upon determining that the hop to the next peer is dead, the peer in question can initiate a procedure for switching to a new next peer, or can alternatively inform a preceding peer in the chain that it should switch to a new next peer.

As can be seen from the above explanation, the concept of the present invention allows the simple replacement of one relay device by another. Equally, the present invention allows the adding or removing of a relay device to an ongoing end-to-end communication. In other words, if necessary, a two-hop connection as shown in FIGS. 4-6 can be augmented to three-hop connection, or a k-hop (k is an integer greater than 1) can simply be switched to a (k−1) hop connection. The addition or removal of a relay device is very similar to the above-described change from an old relay device to a new relay device.

When adding a new relay device, the added relay device starts to build up a receive state and a transmission state exactly in the same way as the above-described new relay device does this after a handover. Consequently, a repeated description is not necessary.

In accordance with an embodiment of the invention, in a data unit relay device that is arranged to operate in an environment in which relay devices can be exchanged, added and/or dropped from an ongoing end-to-end peer connection, the following relay actions for feedback information can be provided. If the relay peer in the relay device receives a receiver-side feedback message with a NACK, and the corresponding data unit has a receipt status of err, then the NACK is forwarded to the next peer on the sender-side, and as soon as the data unit in question is received, it is transmitted to the next peer on the receiver-side. If a receiver-side feedback message with a NACK is received, and the corresponding data unit has a receive status of ok, then the relay peer performs the appropriate retransmission. If a receiver-side feedback message with a RACK is received, and the corresponding data unit has a receive status of ok, then the relay peer forwards the RACK to the next peer on the sender-side in the next feedback message. If a receiver-side feedback message with a RACK is received, and the corresponding data unit has a receive status of err (i.e. the data unit has never been received at said relay device) then the relay peer forwards the RACK to the next peer on the sender-side in the next feedback message. Due to having forwarded a RACK, the relay peer does not wait or expect to receive the corresponding data unit in future. If a receiver-side feedback message with an ACK is received, then the relay peer forwards the ACK to the next peer on the sender-side in the next feedback message, and can possibly remove the corresponding data unit from its buffer, if the relay peer has the receipt of an ACK as a deletion condition. It is noted that the forwarding of an ACK is naturally also done if the corresponding data unit is not present in the buffer of the relay device.

Figure 8:
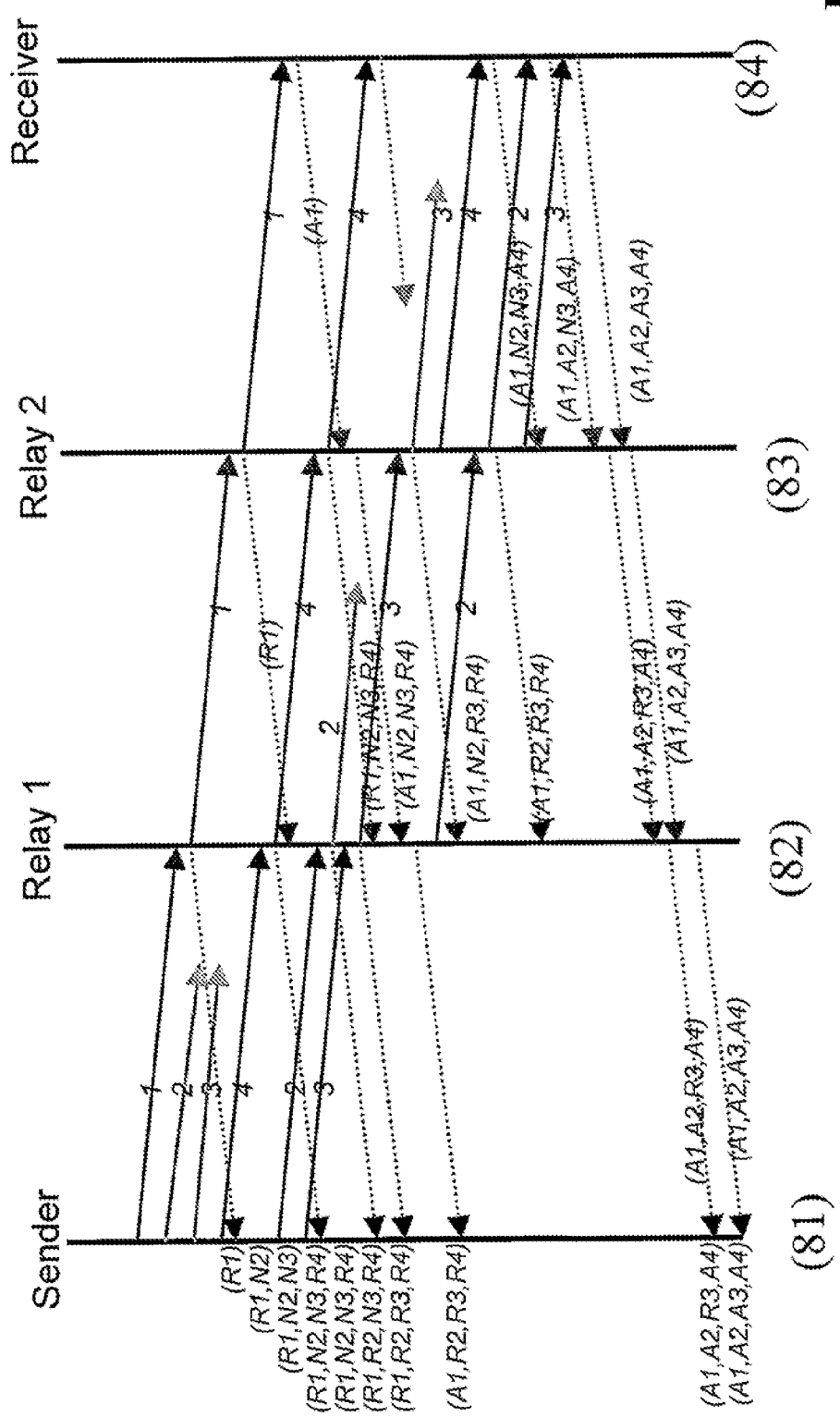
FIG. 8 shows an embodiment of the present invention, in which two relay devices are connected sequentially.

FIG. 8 shows an example of a data unit transmission from a sender 81 via two relay devices 82, 83 to a receiver 84. The nomenclature is the same as used in FIG. 6. In this serial three-hop example, the sender 81 sends four data units being identified by their sequence position identifiers 1, 2, 3 and 4 to the first relay 82. Data units 2 and 3 are lost on the way. As can be seen, the first relay device 82 sends RACKs for the received data units 1 and 4. On the other hand, the sender 81 considers data units 2 and 3 as lost, due to a time-out of a first time-out period TO 1 set in the order of the roundtrip time for the peer-to-peer connection between sender 81 and the first relay 82. Consequently, the sender 81 retransmits data units 2 and 3. In response to these retransmissions, the first relay device 82 sends RACK feedback messages.

As can furthermore be seen, the first relay 82 forwards each received data unit upon arrival. As can be seen, data unit 2 is lost on its way from the first relay 82 to the second relay 83. The first relay performs a retransmission on account of a time-out. Otherwise, the second relay 83 sends RACK feedback messages for each correctly received data unit. The second relay 83 forwards the received data units to the receiver 84. As can be seen in the example, data unit 3 is lost on its way from the second relay 83 to receiver 84, and the second relay 83 accordingly performs a retransmission on account of a time-out. In the example of FIG. 8, it is furthermore shown that the ACK sent by receiver 84 to the second relay 82 is lost. As a consequence, the second relay device 83 also performs a retransmission of data unit number 4 on account of a time-out.

As can also be seen in the example of FIG. 8, feedback messages to the next peer on the sender-side are only sent if appropriate. For example, the first relay 82 does not instantly report the successful delivery of data units to the second relay 83, i.e. the receipt of RACKS. The sending of a feedback message is only triggered in the event of having correctly received a data unit from the adjacent sender-side peer, in which case a RACK is sent, or when forwarding an ACK received from the receiver-side. However, as already mentioned previously, this is only option, and it would equally be possible to immediately forward all RACK messages coming from the receiver-side, to thereby inform the adjacent peer on the sender-side, and ultimately the sender, on the progress of data units from one hop to the next.

The case of removing a relay device from an ongoing end-to-end connection can also be described by looking at the example of FIG. 8. If one assumes that the second relay device 83 is removed, then the first relay device 82 would take over the responsibility. Namely, it would begin to directly send data units to the receiver 84, and to receive feedback messages directly from the receiver 814. If for example the removing of the second relay device 83 would have led to the loss of data units for which the second relay 83 had previously sent RACK messages to the first relay 82, but which had not yet been correctly forwarded to receiver 84, then receiver 84 would eventually send NACK messages to the first relay 82, on the basis of which a retransmission could be performed by the first relay 82, despite the fact that the first relay 82 had previously received a RACK for the same data unit.

Now an example of the present invention will be described in connection with FIG. 7, in which two hops are operated in parallel. In the example, a sender 71 can in parallel send data units to a relay device 72 and a relay device 73. Both relays 72 and 73 communicate with a receiver 74. Such a parallel-hop situation can occur during a handover (i.e. simultaneous communication with an old relay device and a new relay device), or when different access techniques can be used at the same time, i.e. one hop is provided by a WLAN connection and the other by different wireless access technique, e.g. a UMTS connection.

Figure 7:
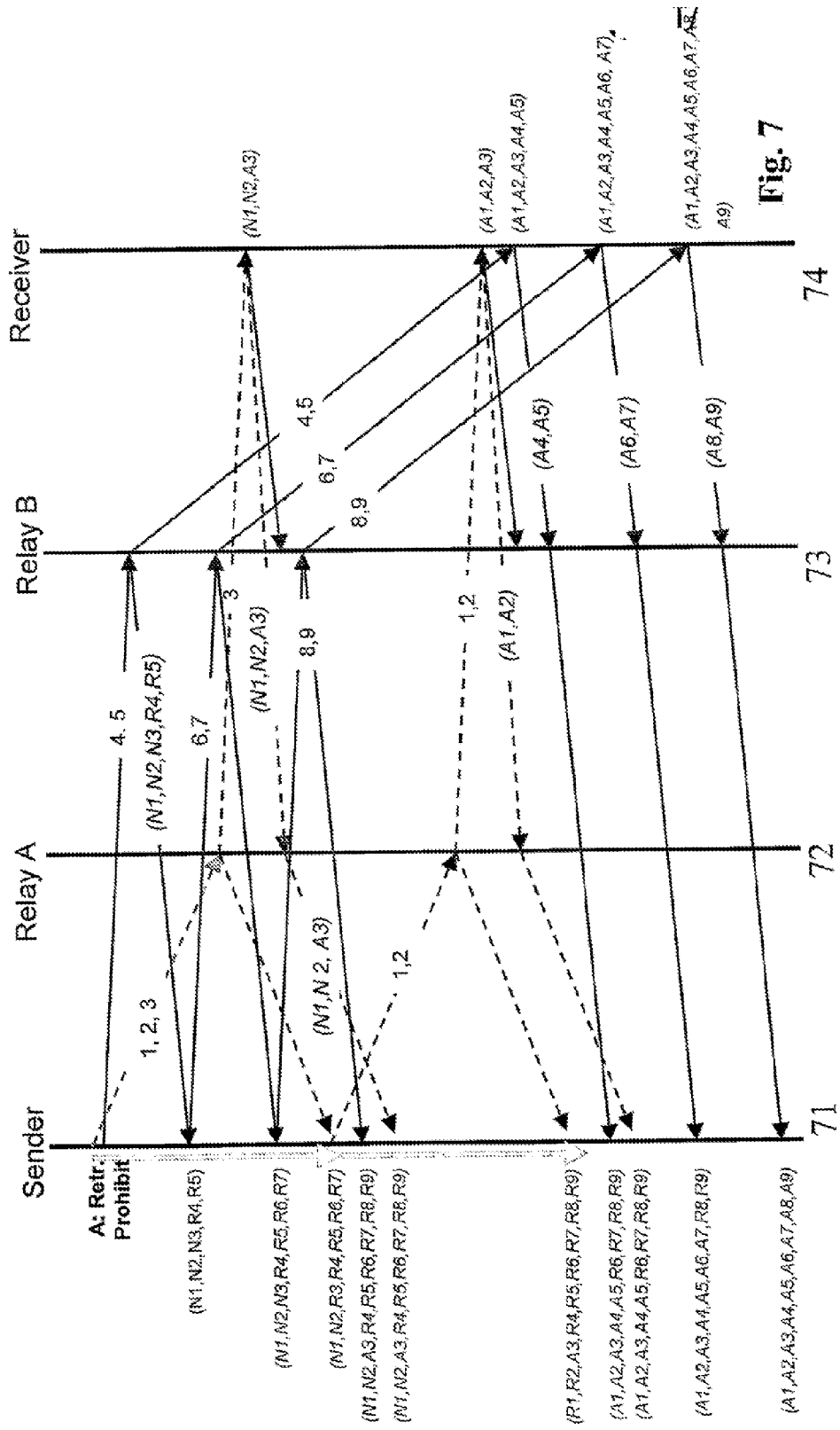
FIG. 7 shows an embodiment of the present invention, in which two relay devices operate in parallel.

In the example of FIG. 7, different delays on the hops are taken into account. For simplicity, as in the examples of FIGS. 6 and 8, the delays are assumed as being constant over time.

In the examples of FIGS. 6 and 8, only one data unit was sent at a time, or more precisely during one transmission time interval (TTI). The invention is by no means restricted thereto, and can also be applied if several data units are sent per TTI, where FIG. 7 gives an example.

Both data unit relay devices 72 and 73 send their feedback messages back to the sender 71. The receiver 74 sends feedback messages to both the data unit relay device 72 and the data unit relay device 73.

In FIG. 7, the data units 1, 2 and 3 are sent to relay 72, and nearly at the same time the data units 4 and 5 are sent to relay device 73. The roundtrip time or delay between the sender 71 and the relay device 72 is more than twice as long as that between the sender 71 and the relay device 73. In the example of FIG. 7, data units 1 and 2 are lost, and only the data unit 3 is successfully received at the relay device 72. The data units 4 and 5 are received successfully at the relay device 73 before said time. In the example of FIG. 7, it is assumed that the relay device 72 and relay device 73 implement a missing data unit detection function. Such a function indicates that a data unit is missing, if a data unit with a sequence position identifier is received, where a gap occurs with respect to the sequence. As a consequence, the relay device 73 detects data units 1, 2 and 3 as missing, because it received a data unit with a sequence position identifier 4. As a consequence, relay device 73 sends a feedback message in which data units 1, 2 and 3 are negatively acknowledged (NACK). In circumstances in which there are no parallel hops, the sending device 71 would retransmit these three data units immediately to the relay device 73. However, when the situation of parallel hops can occur, it is preferable to implement a retransmit prohibit timer, which prohibits a retransmission within a given time period. In the example of FIG. 7, the retransmit prohibit timer was set on the basis of the roundtrip time of the hop between sender 71 and relay device 72. This retransmit prohibit timer expires just when the feedback message from relay 72 arrives, in which data unit number 3 is indicated with a RACK, and data units 1 and 2 with a NACK. At this point in time, the sending device 71 could choose to retransmit the data units 1 and 2 to either relay device 72 or relay device 73. In the example, the data units are retransmitted to relay device 72.

In situations, where a peer of the inventive protocol receives data units from more than one peer in parallel, it is preferable that feedback messages are sent to all peers from which data units can be received. This increases the probability that the feedback information will arrive where it can be put to use. Nonetheless, it is naturally also possible to operate a peer in such a way that it only sends feedback messages to the peer from which it has just received a data unit, or that the peer has a decision procedure for deciding which peer to send a feedback message to.

In the example of FIG. 7, a retransmission prohibit timer was used. It is noted that a retransmission prohibit timer can be used in any retransmission context, i.e. also in systems that only have individual serial hops. The retransmission prohibit timer can be triggered by a selected event, such as the transmission of a data unit and/or the retransmission of a data unit. Within the retransmission prohibit time period, a retransmission is prohibited. If the peers of the present invention are operated such that feedback messages are sent at regular intervals, then it is preferable to employ a retransmission prohibit timer, in order to avoid unnecessary retransmissions, e.g. to avoid unnecessary retransmissions each time that a NACK is received. When combining a retransmission prohibit timer feature with a retransmission time-out feature, the retransmission time-out period (such as TO_1 or TO_2) is set longer than the retransmission prohibit period.

If a peer of the inventive protocol is able to transmit data units to at least two different peers in parallel, then there exists a first value indicative of a roundtrip time between the transmitting peer and the first peer, and a second value indicative of the roundtrip time between the transmitting peer and the second parallel peer. These values could be fixed values, or the control unit could implement procedures for determining one or both of the values. The peer is arranged to employ a retransmission prohibit timer for retransmissions to said peer of the two parallel peers which is associated with the smaller round trip time vale. The retransmission prohibit timer is set based on the larger of the round trip time values.

Figure 9:
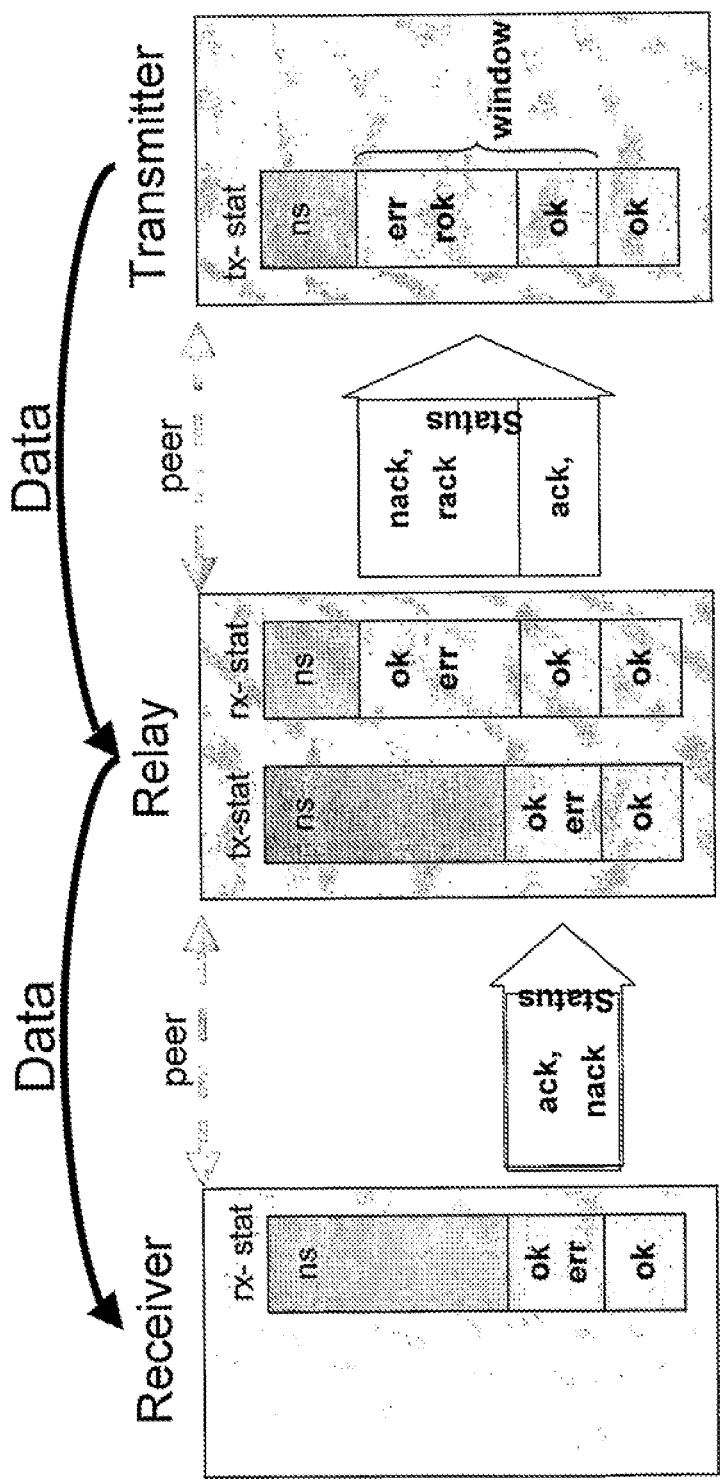
FIG. 9 is an explanatory, schematic diagram for explaining an embodiment of the invention, in which flow control is adjusted based on feedback information.

Now, a further embodiment of the present invention will be described with reference to FIG. 9. FIG. 9 shows an example similar to the one discussed in connection with FIG. 4. In accordance with an example of the present invention, it is possible to use the transmission state, which can also be referred to as the send window of a peer that transmits data units as an indication for the buffer fill state in the next peer to which data units are being sent. The send window comprises the sent data units, for which no feedback for a RACK has been received. As can be seen in FIG. 9, the send window at the transmitter provides information for a flow/congestion control decision. The active send window starts above the highest accumulatively acknowledged (i.e. for which an ACK was received) data unit (i.e. the data unit with the highest sequence position), and typically comprises in the lower part data units for which a RACK has been received, or already an ACK from the receiver. Above there is typically a window region in which data units can be found for which the sender has received a RACK or a NACK.

The amount of data in the send window can therefore be viewed in three parts:

Data units with NACK, not yet received at the next peer, transmitter has retransmission responsibility;

Data units with RACK: received at the next peer, next peer has retransmission responsibility; and Data units with ACK: received at the receiver, i.e. at the end-point, no more retransmission.

If the window is much larger than the pipe capacity and the amount of data units with RACK is larger than the amount of data units with NACK, then the hop following the next peer is congested, because the buffer at the next peer has filled up. Under this condition, the peer that is transmitting should slow down its transmission rate or stop until the ratio of RACKs and NACKS in feedback messages indicate that the situation has changed.

In the above discussion it was assumed that the data units have equal size. If the sizes differ, then the data unit size needs to be taken into account.

As a consequence, in the general case, any peer of the inventive protocol that is arranged to transmit data units is preferably arranged to keep a record of the data units which were sent and for which first type receipt information (RACK) has been received, and of the data units that were sent and for which third type receipt information (NACK) has been received. Then the transmission rate is preferably controlled based on the relationship between an amount of data in the data units for which the first type receipt information has been received and an amount of data in data units for which the third type receipt information has been received.

Although the present invention has been described by making reference to detailed embodiments, the scope of the present invention is not limited to these embodiments, but much rather defined by the appended claims. Also reference signs in the claims do not limit the scope of protection, as they are only intended to make the claims easier to read.

The invention claimed is:

1. A method for implementing a communication protocol where data units are transmitted from a sending peer of said communication protocol to a receiving peer of said communication protocol over one or more relay peers of said communication protocol, using feedback messages sent in a direction of said sending peer, wherein in accordance with said communication protocol said data units are arranged in a sequence and each sent data unit is identifiable by a sequence position identifier, and said feedback messages, using said sequence position identifiers, carry information on a receipt of said data units, said communication protocol providing for at least a first type and a second type of receipt information, said first type (RACK) of receipt information being indicative of a correct receipt of a data unit at one of said one or more relay peers of said communication protocol, and said second type (ACK) of receipt information being indicative of a correct receipt of a data unit at the receiving peer of said communication protocol, and where each of said one or more relay peers is arranged to forward said second type of receipt information in the direction of said sending peer, and said sending peer is arranged to hold each data unit of said sequence until having received a corresponding feedback message with said second type of receipt information.

2. The method of claim 1, wherein the sending peer comprising a data unit buffer for holding the data units of the communication protocol, and a control unit arranged to control a transmission of said data units of said communication protocol, a processing of the feedback messages, a retransmission of said data units based on said feedback messages, and a management of said buffer, said method comprising the steps of: performing a first retransmission control procedure for a given data unit in said buffer that has been sent but for which no first type receipt information has been received, performing a second retransmission control procedure for said given data unit if first type receipt information has been received for said given data unit, and holding said given data unit in said buffer at least until having received said second type (ACK) of receipt information for said given data unit.

3. The method of claim 2, wherein said first retransmission control procedure comprises the steps of starting to monitor a first time-out period upon transmitting said given data unit and retransmitting said given data unit if said first time-out period passes without receiving first or second type receipt information for said given data unit.

4. The method of claim 3, wherein said second retransmission control procedure comprises the steps of starting to monitor a second time-out period upon transmitting said given data unit or upon receiving first type receipt information for said given data unit, and retransmitting said given data unit if said second time-out period passes without receiving second type receipt information for said given data unit.

5. The method of claim 4, further comprising the steps of dynamically adapting said first time-out period based on measurements of a time that passes between a transmission of at least some of said data units and a receipt of respective first type receipt information, and dynamically adapting said second time-out period based on a measurement of a time that passes between a transmission of at least some of said data units and a receipt of respective second type receipt information.

6. The method of claim 2, wherein said communication protocol provides for a third type (NACK) of receipt information that is indicative of an incorrect receipt of a data unit at the receiving peer or the one or more relay peers of said communication protocol.

7. The method of claim 6, wherein said first retransmission control procedure comprises retransmitting said given data unit upon receiving the third type receipt information for said given data unit.

8. The method of claim 6, wherein said second retransmission control procedure comprises retransmitting said given data unit if the third type receipt information for said given data unit has been received.

9. The method of claim 6, further comprising the steps of keeping a record of the data units in said buffer which were sent and for which first type receipt information has been received and of the data units in said buffer which were sent and for which third type receipt information has been received, and controlling the transmission rate on the basis of the relationship between an amount of data in data units for which first type receipt information has been received and an amount of data in data units for which third type receipt information has been received.

10. The method of claim 2, further comprising the step of controlling the transmission of said data units to a first and a second peer of said communication protocol in parallel.

11. The method of claim 2, further comprising the step of employing a retransmission prohibit timer.

12. The method of claim 1, wherein each relay peer comprising:
a data unit buffer for holding receive data units of the communication protocol received from a sender-side peer of said communication protocol, wherein the sender-side peer includes either the sending peer or one of the one or more relay peers, and for holding send data units of said communication protocol to be sent to a receiver-side peer of said communication protocol, where the receiver-side peer includes either the receiving peer or one of the one or more relay peers,
a control unit arranged to control
a receiving of said receive data units,
a transmission of said send data units,
a processing of receiver-side feedback messages received from said receiver-side peer,
a retransmission of said send data units to said receiver-side peer based on said feedback messages,
a transmission of sender-side feedback messages to said sender-side peer, and
a management of said buffer,
as a relay peer of said communication protocol, where in accordance with said communication protocol said receive data units are arranged in a sequence and each receive data unit is identifiable by a sequence position identifier, and said send data units are arranged in the same sequence such that for each receive data unit there is a corresponding send data unit having a same payload section and the same sequence position identifier, and both said sender-side and said receiver-side feedback messages, using said sequence position identifiers, carry information on a receipt of said data units, said method comprising the steps of:

sending a sender-side feedback message carrying said first type (RACK) of receipt information for a given receive data unit that was correctly received, performing a retransmission control process for a given send data unit in said buffer that has been sent, based on said receiver-side feedback messages, holding said given send data unit in said buffer until a deletion condition is fulfilled, and after having received said second type (ACK) of receipt information for a given sequence position identifier in a receiver-side feedback message, sending to said sender-side peer a sender-side feedback message carrying said second type (ACK) of receipt information for said given sequence position identifier.

13. The method of claim 12, wherein said retransmission control process comprises the steps of starting to monitor a time-out period upon transmitting said given send data unit and retransmitting said given send data unit if said time-out period passes without receiving second type receipt information for said given data unit.

14. The method of claim 12, wherein said retransmission control process comprises the steps of:

performing a first retransmission control procedure for a given send data unit in said buffer that has been sent but for which no first type receipt information has been received, and performing a second retransmission control procedure for said given send data unit if first type receipt information has been received for said given send data unit.

15. The method of claim 14, wherein said first retransmission control procedure comprises the steps of starting to monitor a first time-out period upon transmitting said given send data unit and retransmitting said given send data unit if said first time-out period passes without receiving first or second type receipt information for said given send data unit.

16. The method of claim 15, wherein said second retransmission control procedure comprises the steps of starting to monitor a second time-out period upon transmitting said given send data unit or upon receiving first type receipt information for said given send data unit, and retransmitting said given send data unit if said second time-out period passes without receiving second type receipt information for said given send data unit.

17. The method of claim 16, further comprising the steps of dynamically adapting said first time-out period based on measurements of a time that passes between a transmission of at least some of said send data units and a receipt of respective first type receipt information, and dynamically adapting said second time-out period based on a measurement of a time that passes between a transmission of at least some of said send data units and a receipt of respective second type receipt information.

18. The method of claim 14, wherein said communication protocol provides for a third type (NACK) of receipt information that is indicative of an incorrect receipt of a data unit at the receiving peer or the one or more relay peers of said communication protocol.

19. The method of claim 18, wherein said first retransmission control procedure comprises the step of retransmitting said given send data unit upon receiving third type receipt information for said given send data unit.

20. The method of claim 18, wherein said second retransmission control procedure comprises the step of retransmitting said given send data unit if third type receipt information for said given send data unit has been received.

21. The method of claim 18, further comprising the steps of keeping a record of the send data units in said buffer which were sent and for which first type receipt information has been received and of the send data units in said buffer which were sent and for which third type receipt information has been received, and controlling the transmission rate of said send data units on the basis of the relationship between an amount of data in send data units for which first type receipt information has been received and an amount of data in data units for which third type receipt information has been received.

22. The method of claim 18, wherein if a receiver-side feedback message is received that carries said third type (NACK) of receipt information for a sequence position identifier for which no data unit is stored in said buffer, then a sender-side feedback message is sent that carries said third type (NACK) of receipt information for said sequence position identifier for which no data unit is stored in said buffer.

23. The method of claim 22, further comprising the step of responding to receiving a receive data unit associated with said sequence position identifier for which no data unit is stored in said buffer, a corresponding send data unit is sent.

24. The method of claim 12, wherein if a receiver-side feedback message is received that carries said first type (RACK) of receipt information for a sequence position identifier, then a sender-side feedback message is sent that carries said first type (RACK) of receipt information for the same sequence position identifier.

25. The method of claim 24, further comprises only sending said sender-side feedback message that carries said first type (RACK) of receipt information for said same sequence position identifier if there is no data unit stored in said buffer for said same sequence position identifier.

26. The method of claim 12, wherein said deletion condition is fulfilled if said second type (ACK) of receipt information is received for said given send data unit.

27. The method of claim 12, wherein said deletion condition is fulfilled if a purge time period for said given send data unit has elapsed.

28. The method of claim 12, further comprising the step of controlling the transmission of said send data units to a first and a second receiver-side peer of said communication protocol in parallel.

29. The method of claim 12, further comprising the step of employing a retransmission prohibit timer.

30. A communication network in which there is implemented a communication protocol for transmitting data units from a sending peer of said communication protocol to a receiving peer of said communication protocol over one or more relay peers of said communication protocol, using feedback messages sent in a direction of said sending peer, wherein in accordance with said communication protocol said data units are arranged in a sequence and each sent data unit is identifiable by a sequence position identifier, and said feedback messages, using said sequence position identifiers, carry information on a receipt of said data units, said communication protocol providing for at least a first type and a second type of receipt information, said first type (RACK) of receipt information being indicative of a correct receipt of a data unit at one of said one or more relay peers of said communication protocol, and said second type (ACK) of receipt information being indicative of a correct receipt of a data unit at the receiving peer of said communication protocol, and where each of said one or more relay peers is arranged to forward said second type of receipt information in the direction of said sending peer, and said sending peer is arranged to hold each data unit of said sequence until having received a corresponding feedback message with said second type of receipt information.

31. The communication network of claim 30, wherein the sending peer comprising:
   a data unit buffer for holding the data units of the communication protocol,
   a control unit arranged to control
      a transmission of said data units of said communication protocol,
      a processing of the feedback messages,
      a retransmission of said data units based on said feedback messages, and
      a management of said buffer,
   said control unit being arranged to perform a first retransmission control procedure for a given data unit in said buffer that has been sent but for which no first type receipt information has been received, to perform a second retransmission control procedure for said given data unit if first type receipt information has been received for said given data unit, and to hold said given data unit in said buffer at least until having received said second type (ACK) of receipt information for said given data unit.

32. The communication network of claim 31, wherein said first retransmission control procedure comprises starting to monitor a first time-out period upon transmitting said given data unit and retransmitting said given data unit if said first time-out period passes without receiving first or second type receipt information for said given data unit.

33. The communication network of claim 32, wherein said second retransmission control procedure comprises starting to monitor a second time-out period upon transmitting said given data unit or upon receiving first type receipt information for said given data unit, and retransmitting said given data unit if said second time-out period passes without receiving second type receipt information for said given data unit.

34. The communication network of claim 33, wherein said control unit is arranged to dynamically adapt said first time-out period based on measurements of a time that passes between a transmission of at least some of said data units and a receipt of respective first type receipt information, and to dynamically adapt said second time-out period based on a measurement of a time that passes between a transmission of at least some of said data units and a receipt of respective second type receipt information.

35. The communication network of claim 31, wherein said communication protocol provides for a third type (NACK) of receipt information that is indicative of an incorrect receipt of a data unit at the receiving peer or the one or more relay peers of said communication protocol.

36. The communication network of claim 35, wherein said first retransmission control procedure comprises retransmitting said given data unit upon receiving the third type receipt information for said given data unit.

37. The communication network of claim 35, wherein said second retransmission control procedure comprises retransmitting said given data unit if the third type receipt information for said given data unit has been received.

38. The communication network of claim 35, wherein said control unit is arranged to keep a record of the data units in said buffer which were sent and for which first type receipt information has been received and of the data units in said buffer which were sent and for which third type receipt information has been received, and to control the transmission rate on the basis of the relationship between an amount of data in data units for which first type receipt information has been received and an amount of data in data units for which third type receipt information has been received.

39. The communication network of claim 31, wherein said control unit is arranged to control the transmission of said data units to a first and a second peer of said communication protocol in parallel.

40. The communication network of claim 31, wherein said control unit is arranged to employ a retransmission prohibit timer.

41. The communication network of claim 30, wherein each relay peer comprising:
   a data unit buffer for holding receive data units of the communication protocol received from a sender-side peer of said communication protocol, wherein the sender-side peer includes either the sending peer or one of the one or more relay peers, and for holding send data units of said communication protocol to be sent to a receiver-side peer of said communication protocol, where the receiver-side peer includes either the receiving peer or one of the one or more relay peers,
   a control unit arranged to control
   a receiving of said receive data units,
   a transmission of said send data units,
   a processing of receiver-side feedback messages received from said receiver-side peer,
   a retransmission of said send data units to said receiver-side peer based on said feedback messages,
   a transmission of sender-side feedback messages to said sender-side peer, and
   a management of said buffer,
   as a relay peer of said communication protocol, where in accordance with said communication protocol said receive data units are arranged in a sequence and each receive data unit is identifiable by a sequence position identifier, and said send data units are arranged in the same sequence such that for each receive data unit there is a corresponding send data unit having a same payload section and the same sequence position identifier, and both said sender-side and said receiver-side feedback messages, using said sequence position identifiers, carry information on a receipt of said data units,
   said control unit being arranged
      to send a sender-side feedback message carrying said first type (RACK) of receipt information for a given receive data unit that was correctly received,
      to perform a retransmission control process for a given send data unit in said buffer that has been sent, based on said receiver-side feedback messages,
      to hold said given send data unit in said buffer until a deletion condition is fulfilled, and
      after having received said second type (ACK) of receipt information for a given sequence position identifier in a receiver-side feedback message, to send to said sender-side peer a sender-side feedback message carrying said second type (ACK) of receipt information for said given sequence position identifier.

42. The communication network of claim 41, wherein said retransmission control process comprises starting to monitor a time-out period upon transmitting said given send data unit and retransmitting said given send data unit if said time-out period passes without receiving second type receipt information for said given data unit.

43. The communication network of claim 41, wherein said retransmission control process comprises
  performing a first retransmission control procedure for a given send data unit in said buffer that has been sent but for which no first type receipt information has been received, and
  performing a second retransmission control procedure for said given send data unit if first type receipt information has been received for said given send data unit.

44. The communication network of claim 43, wherein said first retransmission control procedure comprises starting to monitor a first time-out period upon transmitting said given send data unit and retransmitting said given send data unit if said first time-out period passes without receiving first or second type receipt information for said given send data unit.

45. The communication network of claim 44, wherein said second retransmission control procedure comprises starting to monitor a second time-out period upon transmitting said given send data unit or upon receiving first type receipt information for said given send data unit, and retransmitting said given send data unit if said second time-out period passes without receiving second type receipt information for said given send data unit.

46. The communication network of claim 45, wherein said control unit is arranged to dynamically adapt said first time-out period based on measurements of a time that passes between a transmission of at least some of said send data units and a receipt of respective first type receipt information, and to dynamically adapt said second time-out period based on a measurement of a time that passes between a transmission of at least some of said send data units and a receipt of respective second type receipt information.

47. The communication network of claim 43, wherein said communication protocol provides for a third type (NACK) of receipt information that is indicative of an incorrect receipt of a data unit at the receiving peer or the one or more relay peers of said communication protocol.

48. The communication network of claim 47, wherein said first retransmission control procedure comprises retransmitting said given send data unit upon receiving third type receipt information for said given send data unit.

49. The communication network of claim 47, wherein said second retransmission control procedure comprises retransmitting said given send data unit if third type receipt information for said given send data unit has been received.

50. The communication network of claim 47, wherein said control unit is arranged to keep a record of the send data units in said buffer which were sent and for which first type receipt information has been received and of the send data units in said buffer which were sent and for which third type receipt information has been received, and to control the transmission rate of said send data units on the basis of the relationship between an amount of data in send data units for which first type receipt information has been received and an amount of data in data units for which third type receipt information has been received.

51. The communication network of claim 47, wherein said control unit is arranged such that if a receiver-side feedback message is received that carries said third type (NACK) of receipt information for a sequence position identifier for which no data unit is stored in said buffer, a sender-side feedback message is sent that carries said third type (NACK) of receipt information for said sequence position identifier for which no data unit is stored in said buffer.

52. The communication network of claim 51, wherein said control unit is arranged such that in response to receiving a receive data unit associated with said sequence position identifier for which no data unit is stored in said buffer, a corresponding send data unit is sent.

53. The communication network of claim 41, wherein said control unit is arranged such that if a receiver-side feedback message is received that carries said first type (RACK) of receipt information for a sequence position identifier, a sender-side feedback message is sent that carries said first type (RACK) of receipt information for the same sequence position identifier.

54. The communication network of claim 53, wherein said control unit is arranged such that said sender-side feedback message that carries said first type (RACK) of receipt information for said same sequence position identifier is only sent if there is no data unit stored in said buffer for said same sequence position identifier.

55. The communication network of claim 41, wherein said deletion condition is fulfilled if said second type (ACK) of receipt information is received for said given send data unit.

56. The communication network of claim 41, wherein said deletion condition is fulfilled if a purge time period for said given send data unit has elapsed.

57. The communication network of claim 41, wherein said control unit is arranged to control the transmission of said send data units to a first and a second receiver-side peer of said communication protocol in parallel.

58. The communication network of claim 41, wherein said control unit is arranged to employ a retransmission prohibit timer.

* * * * *